United States Patent
Singhal et al.

(10) Patent No.: US 12,094,032 B2
(45) Date of Patent: Sep. 17, 2024

(54) POSE RECOMMENDATION AND REAL-TIME GUIDANCE FOR USER-GENERATED CONTENT

(71) Applicant: Adobe Inc., San Jose, CA (US)

(72) Inventors: Gourav Singhal, New Delhi (IN); Tridib Das, Bangalore (IN); Sourabh Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/946,202

(22) Filed: Sep. 16, 2022

(65) Prior Publication Data
US 2024/0095969 A1    Mar. 21, 2024

(51) Int. Cl.
*G06T 11/00*    (2006.01)
*G06Q 30/0601*    (2023.01)
*G06T 7/246*    (2017.01)
*G06V 40/20*    (2022.01)
*H04N 23/611*    (2023.01)

(52) U.S. Cl.
CPC .......... *G06T 11/00* (2013.01); *G06Q 30/0627* (2013.01); *G06Q 30/0643* (2013.01); *G06T 7/251* (2017.01); *G06V 40/28* (2022.01); *H04N 23/611* (2023.01)

(58) Field of Classification Search
None
See application file for complete search history.

(56) References Cited

U.S. PATENT DOCUMENTS

| | | |
|---|---|---|
| 9,792,733 B2 | 10/2017 | Rosenthal et al. |
| 10,631,050 B2 | 4/2020 | Fransen et al. |
| 11,321,768 B2 | 5/2022 | Beauchamp |
| 2018/0182141 A1 | 6/2018 | Caballero et al. |
| 2022/0207786 A1 | 6/2022 | Ren et al. |
| 2022/0245926 A1* | 8/2022 | Huang ............... G06V 10/454 |
| 2022/0394194 A1* | 12/2022 | Tsuda .................. H04N 5/2621 |

FOREIGN PATENT DOCUMENTS

| | | | |
|---|---|---|---|
| WO | 2022146766 A1 | 7/2022 | |
| WO | WO-2022227393 A1 * | 11/2022 | ......... H04N 5/23216 |

OTHER PUBLICATIONS

Consumer Generated Marketing: How to Boost Consumer Engagement, Available Online at: https://getflowbox.com/blog/consumer-generated-marketing/?referrer=photoslurp, 2022, pp. 1-15.
(Continued)

*Primary Examiner* — Jwalant Amin
(74) *Attorney, Agent, or Firm* — Kilpatrick Townsend & Stockton LLP

(57) ABSTRACT

In some embodiments, techniques for producing user-generated content are provided. For example, a process may involve sending a product identifier; receiving a first candidate image that is associated with the product identifier; determining that a similarity between a user structure and a target structure satisfies a threshold condition, wherein the user structure characterizes a figure of a user in a first input image and the target structure is based on a pose guide associated with the first candidate image; and capturing, based on the determining, the first input image.

20 Claims, 19 Drawing Sheets

(56) References Cited

OTHER PUBLICATIONS

Google Images API, Available Online at: https://serpapi.com/images-results, Accessed from Internet on Jan. 10, 2023, pp. 1-6.
Hough Transform, Wikipedia, Nov. 9, 2022, Available Online at: https://en.wikipedia.org/wiki/Hough_transform, pp. 1-9.
Lecture 11: Segmentation and Pose Estimation, COMP 150DL, Tufts Univ., Mar. 30, 2017, 144 pages.
U-Net, Wikipedia, Sep. 8, 2022, Available Online at: https://en.wikipedia.org/wiki/U-Net, pp. 1-3.
Aberman et al., Learning Character-Agnostic Motion for Motion Retargeting in 2D, ACM Transactions on Graphics, vol. 38, No. 4, Article 75, Jul. 2019, pp. 1-14.
Atrevi et al., 3D Human Poses Estimation from a Single 2d Silhouette, HAL Open Science, Nov. 17, 2017, 10 pages.
Ballard et al., Generalizing the Hough Transform to Detect Arbitrary Shapes*, Pattern Recognition, vol. 13, No. 2, 1981, pp. 111-122.
Cao et al., Realtime Multi-Person 2D Pose Estimation using Part Affinity Fields, IEEE Conference on Computer Vision and Pattern Recognition (CVPR), Apr. 14, 2017, arXiv:1611.08050v2, 9 pages.
Cartay, How to Encourage Customers to Post Photos about Your Brand, Available Online at: https://www.digitaldoughnut.com/articles/2016/june/how-to-encourage-customers-to-post-photos-about-yo, Jun. 8, 2016, 14 pages.
Fatkhannudin et al., Gender Classification Using Fisherface and Support Vector Machine on Face Image, Signal and Image Processing Letters, vol. 1, No. 1, Mar. 2019, pp. 32-40.
Hofmann et al., Multi-View 3D Human Pose Estimation in Complex Environment, International Journal of Computer Vision, vol. 96, No. 1, May 2011, pp. 103-124.
Lee et al., An Approach to Image-Based Motion Retargeting, Department of Computer Engineering, Oct. 2013, 6 pages.
Li, ECE 5582 Computer Vision Lec 14: Eigenface and Fisherface, Department of CSEE, UMKC, 2019, pp. 1-46.
Lim et al., Body Shape-guided Motion Retargeting to Reduce Effort on Human to Humanoid Landmark Placements, IEEE Access, vol. 4, 2016, pp. 1-15.
Lin et al., Microsoft COCO: Common Objects in Context, European Conference on Computer Vision, Feb. 21, 2015, arXiv:1405.0312v3, pp. 1-15.
Lu et al., 3D Articulated Skeleton Extraction Using a Single Consumer-Grade Depth Camera, Computer Vision and Image Understanding, vol. 188, No. 11, Nov. 2019, pp. 1-15.
Madaras et al., Skeleton-Based Matching for Animation Transfer and Joint Detection, SCCG '14: Proceedings of the 30th Spring Conference on Computer Graphics, May 28-30, 2014, pp. 91-98.
Monzani et al., Using an Intermediate Skeleton and Inverse Kinematics for Motion Retargeting, Computer Graphics Forum, vol. 19, No. 3, Sep. 2000, 9 pages.
Mroz et al., Comparing the Quality of Human Pose Estimation with BlazePose or OpenPose, 4th International Conference on Bio-Engineering for Smart Technologies (BioSmart), Dec. 2021, 4 pages.
Remondino et al., 3D Reconstruction of Human Skeleton from Single Images or Monocular Video Sequences, 25th Pattern Recognition Symposium, Lecture Notes in Computer Science, Springer, DAGM, Sep. 2003, 8 pages.
Ronneberger et al., U-Net: Convolutional Networks for Biomedical Image Segmentation, Lecture Notes in Computer Science, vol. 9351, May 18, 2015, arXiv : 1505.04597v1, pp. 1-8.
Wang et al., Dance in the Wild: Monocular Human Animation with Neural Dynamic Appearance Synthesis, International Conference on 3D Vision (3DV), Nov. 10, 2021, arXiv:2111.05916v1, 10 pages.
Wang et al., Robust 3D Human Pose Estimation from Single Images or Video Sequences, Journal of Latex Class Files, vol. 6, No. 1, Jan. 2007, pp. 1-14.
Zhang et al., Pose2Seg: Detection Free Human Instance Segmentation, EEE/CVF Conference on Computer Vision and Pattern Recognition (CVPR), Apr. 8, 2019, arXiv: 1803.10683v3, pp. 1-10.

* cited by examiner

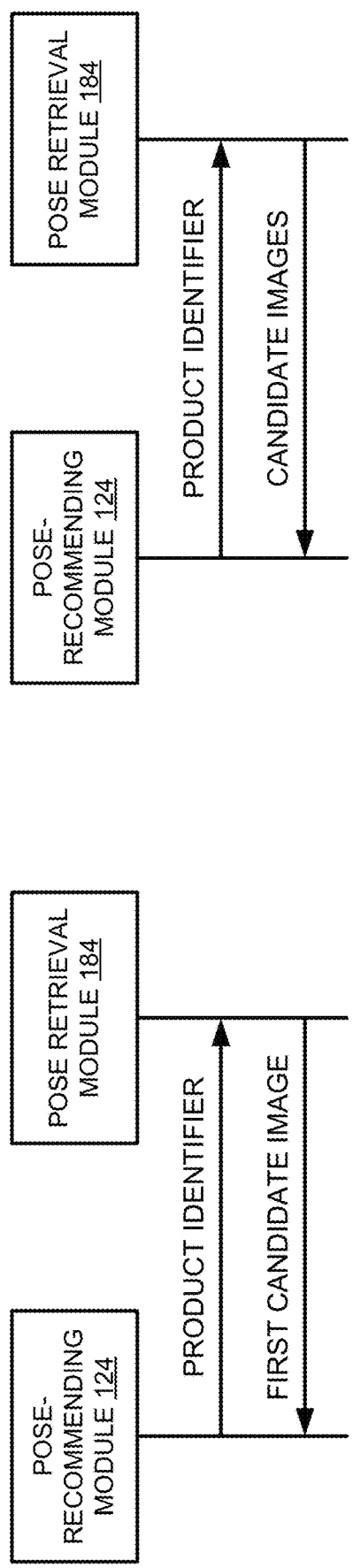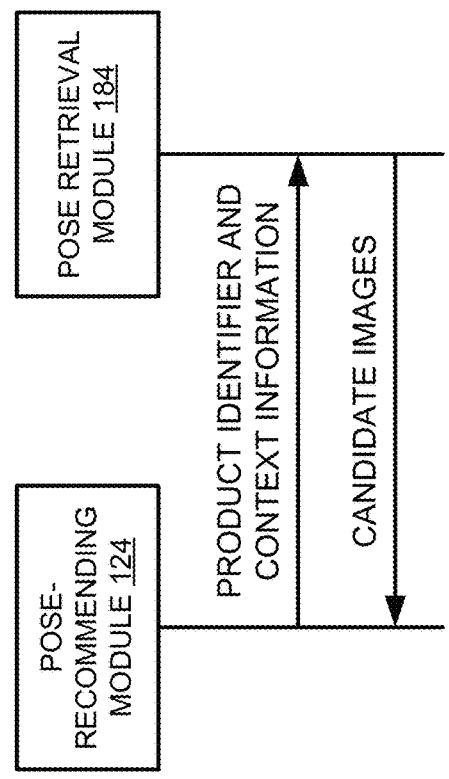

set 510 of candidate images

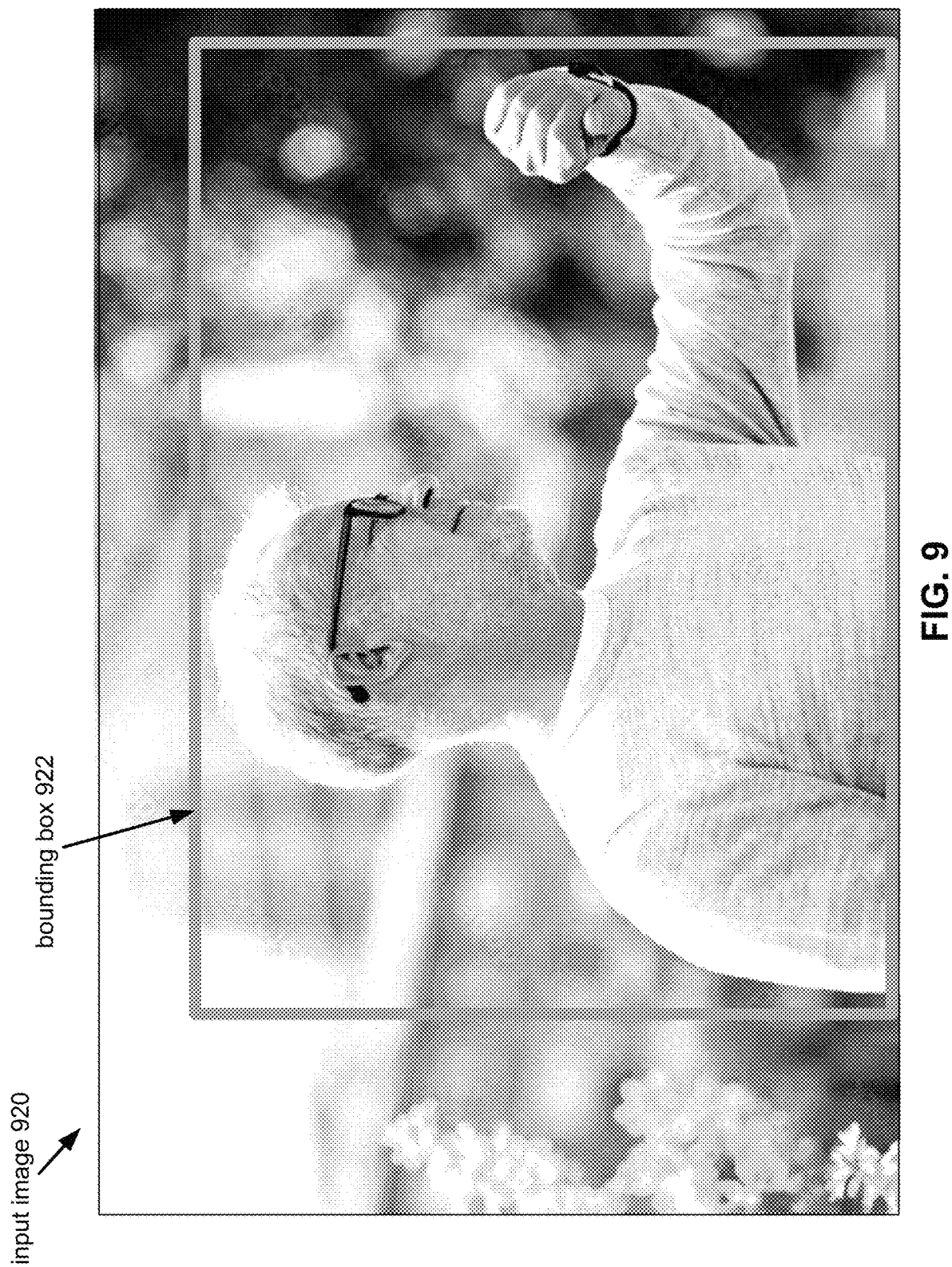

POSE RECOMMENDATION AND REAL-TIME GUIDANCE FOR USER-GENERATED CONTENT

TECHNICAL FIELD

This disclosure relates generally to image selection and image capture. More specifically, but not by way of limitation, this disclosure relates to context-based image selection and guided image capture.

BACKGROUND

Online shopping platforms (also called "e-commerce platforms") offer increased opportunities for consumer engagement. For example, online shopping platforms typically provide the ability for users to enter reviews of products being offered for sale. An online shopping platform may also allow users to upload other types of user-generated content (UGC), such as photos of products in actual use. Vendors encourage UGC as a cost-effective way to increase authenticity and consumer interest.

SUMMARY

Certain embodiments involve context-based image selection and guided image capture. In some embodiments, for example, a method of producing user-generated content (UGC) guides a user to imitate a pose that has been recommended for the product and automatically captures an image of the user in the recommended pose.

In some examples, a user of a computing device (e.g., a smartphone or tablet) uses an e-commerce app executing on the computing device to capture an image of the user wearing a product that the user has purchased. The e-commerce app presents the user with a number of candidate images showing different poses that are recommended for the product, receives the user's selection of a candidate image, and guides the user in real-time to imitate the corresponding pose. When the e-commerce app has determined that the user's pose in a captured image is sufficiently similar to the selected pose, it presents the captured image to the user for approval and uploads the approved image to a UGC section of an online shopping platform.

Additional features and advantages of exemplary embodiments of the present disclosure will be set forth in the description which follows, and in part will be obvious from the description, or will be learned by the practice of such exemplary embodiments. These illustrative embodiments are mentioned not to limit or define the disclosure, and not to identify key elements or indicate a scope, but rather to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 4A-4C show examples of communications between a pose-recommending module and a pose retrieval module, according to certain embodiments of the present disclosure.

FIG. 9 shows an example of an input image and a bounding box, according to certain embodiments of the present disclosure.

DETAILED DESCRIPTION

Techniques described herein use context-based image selection to provide a user with one or more recommended pose images ("candidate images") that are relevant to a product with which the user wishes to pose. For example, modules as described herein may be used to incorporate pose-recommendation and pose-guidance functionalities into an e-commerce app.

Figure 1:
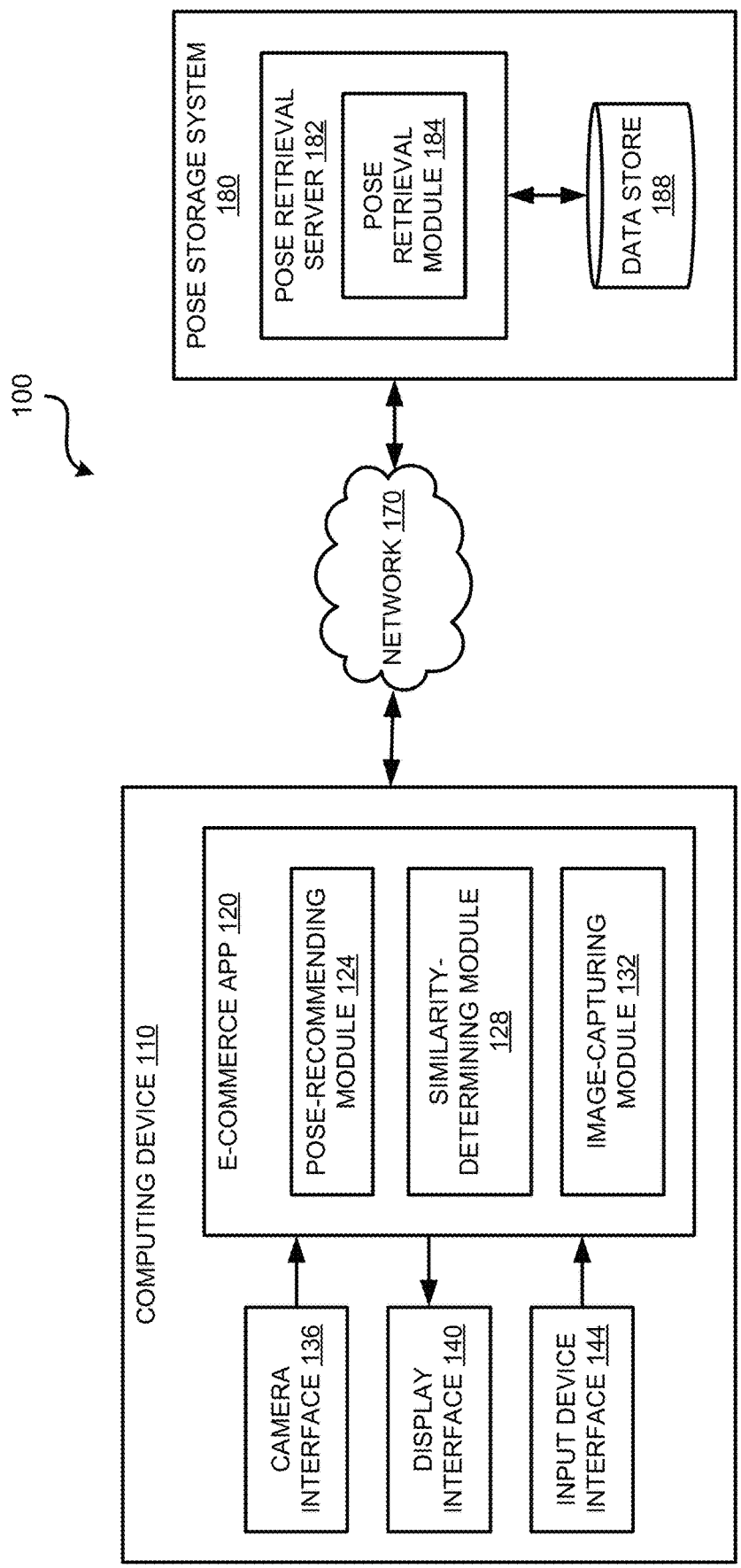
FIG. 1 depicts an example of a computing environment in which a computing device uses an e-commerce app to obtain a candidate image from a pose storage system, according to certain embodiments of the present disclosure.

FIG. 1 is an example of a computing environment that includes a computing device and a pose storage system, according to certain embodiments of the present disclosure. In one example, a user who wishes to obtain and upload a photo of themselves wearing a purchased product uses the computing device to obtain a set of candidate images that are relevant to the product from the pose storage system. From among the set of candidate images, the user selects a candidate image that shows a person in a pose that the user wishes to imitate. Using a front-facing camera of the computing device and a display of the computing device, an e-commerce app guides the user to imitate the desired pose by overlaying a structure of the person in the desired pose over the real-time image of the user and displaying the result to the user. When the e-commerce app determines that the user's pose is sufficiently similar to the desired pose, a photo of the user is captured and presented to the user for uploading (e.g., to a UGC section of an online shopping platform).

The e-commerce market is growing at a very fast pace, allowing users across the globe to purchase products online from anywhere in a fraction of seconds. UGC has proven to be a major factor impacting consumers' buying decisions, providing a perspective that tends to have a large influence on a potential purchaser. UGC that is appealing can play an important role in driving sales, but unfortunately the quality of UGC varies widely in practice.

With respect to clothing and accessories (e.g., a purse, a belt, a backpack, a piece or set of jewelry, or some other object that is worn), poses play a very important role in communicating products in e-commerce platforms. A good pose may evoke a sense of feeling that the viewer associates with the product that is being worn. The range of poses that may be appealing for one product may differ greatly from the range of poses that may be appealing for a different product, and the same product can be used and posed in many different ways and contexts, to evoke many different feelings.

However, it is unfortunate that posing with a product in a manner that evokes a desired feeling, or even posing with a product in a manner that is appealing to the viewer, is not intuitive. No one likes to create or to see unappealing content, and many users do not bother to upload images in the UGC sections of online shopping platforms. From the perspective of a brand, UGC that depicts the brand's products in an unappealing manner is also not desirable.

Although online shopping platforms provide consumers with the ability to upload user reviews and photos showing the user posing with their purchases, there has been no way for a brand or vendor to assist buyers in real time to create better UGC content. As a result, the UGC section of an online shopping platform may be a clutter of non-appealing content, with images of users posing in ways that obscure the product or otherwise fail to convey a favorable impression of the product to the viewer.

Techniques as described herein may be implemented to counteract such problems by suggesting poses that can really make the product appealing. Such techniques may be used to address two underlying issues: finding a pose that is appropriate for the product, and providing the user with assistance in achieving the desired pose. In some embodiments, poses are recommended to the user in real time, based on the product and possibly on other contextual information, such as the user's gender. Embodiments may also assist the user to imitate the suggested pose successfully by guiding the user's movement in real time. Potential advantages may include eliminating the need for a user to search for poses based for a given product across different web platforms and increasing the likelihood that the user can achieve a desired pose to capture an appealing photo with their purchase.

As used herein, the term "user-generated content" or "UGC" is used to refer to text, photos, and other content that pertains to products and is posted online, where the content is created by consumers rather than by vendors. As used herein, the term "online shopping platform" (or "e-commerce platform") is used to refer to a software application that allows users to browse and purchase products over the Internet and to participate in after-sale activities, such as posting user reviews and other UGC. As used herein, the term "e-commerce app" is used to refer to a dedicated software application installed on a client device (e.g., a smartphone or tablet) for communication with an online shopping platform.

As used herein, the term "pose image" is used to refer to an image that includes a figure of a person (e.g., at least part of the person) that is posing with a clothing or accessory product in a manner to be imitated. As used herein, the term "candidate image" is used to refer to a pose image that is recommended for a given product. As used herein, the term "pose guide" is used to refer to a structure that characterizes a figure of a person in a pose image. As used herein, the term "skeleton" is used to refer to an articulated structure of a human figure that is algorithmically extracted from one or more images of the human figure.

Referring now to the drawings, FIG. 1 is an example of a computing environment 100 that includes a computing device 110 (e.g., a smartphone or tablet) and a pose storage system 180, according to certain embodiments of the present disclosure. The computing device 110 includes a camera interface 136 that provides an interface to at least a front-facing camera of the computing device 110, a display interface 140 that provides an interface to a display of the computing device 110, and an input device interface 144 that provides an interface to at least one input device of the computing device 110. In one example, the display interface 140 and the input device interface 144 provide respective interfaces to a touchscreen display of the computing device 110.

The computing environment 100 also includes a pose storage system 180 that includes a pose retrieval server 182 and a data store 188 (e.g., a single storage device, a storage area network, etc.) that stores a plurality of pose images. The computing environment 100 further includes a network 170, which may be a local-area network (LAN), a wide-area network (WAN), the Internet, or any other networking topology known in the art that connects the computing device 110 to the pose storage system 180.

An e-commerce app 120 is installed on the computing device 110 and is configured to execute on at least one processor of the computing device 110. The e-commerce app 120 includes a pose-recommending module 124, a similarity-determining module 128, and an image capturing module 132. The pose-recommending module 124 is configured to communicate, via the network 170, with a pose retrieval module 184 that is configured to execute on at least one processor of the pose retrieval server 182.

Figure 2:
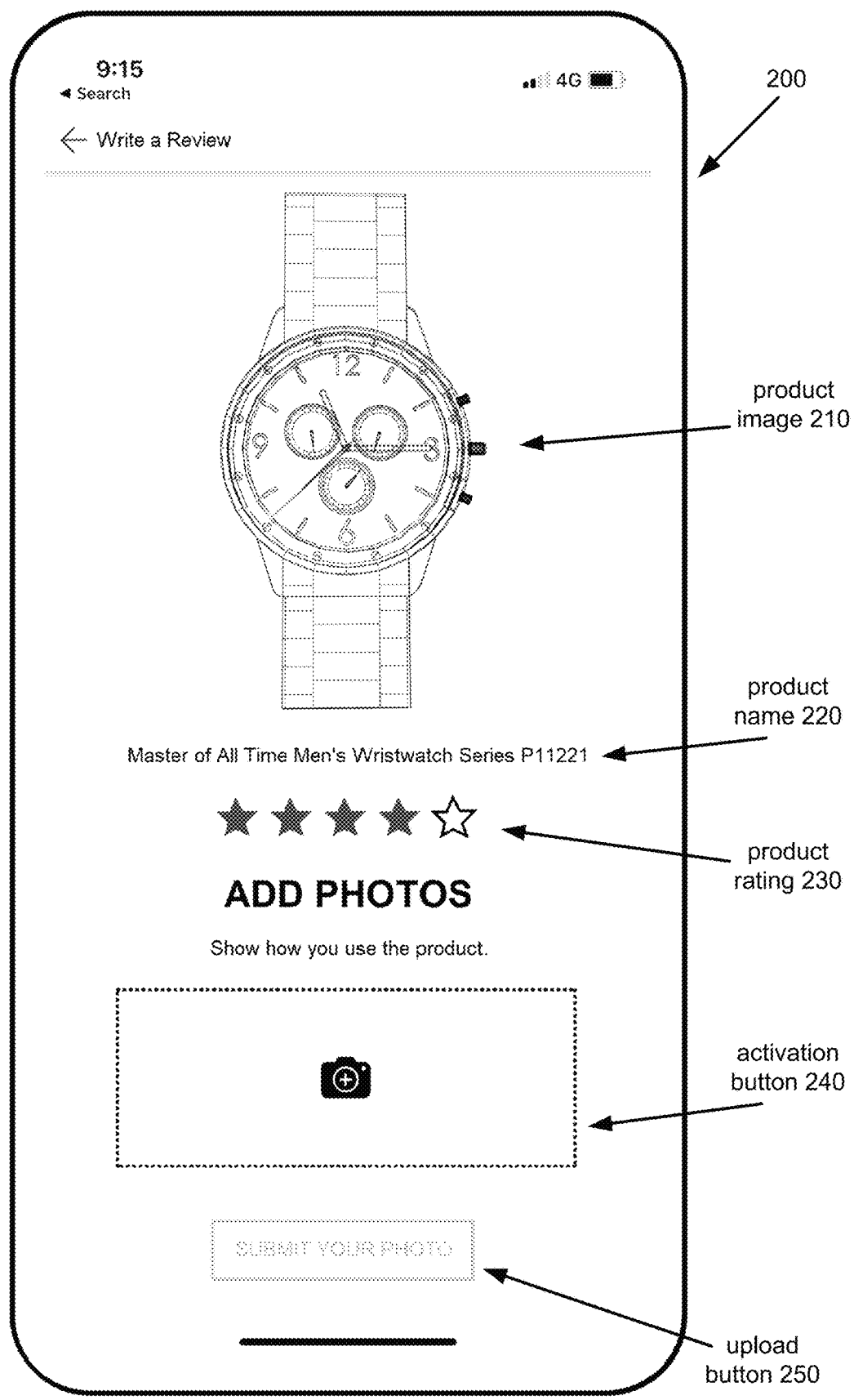
FIG. 2 shows an example of a review screen of an e-commerce app as displayed on a screen of a computing device, according to certain embodiments of the present disclosure.

FIG. 2 shows an example of a review screen 200 of the e-commerce app 120 as displayed on a screen of the computing device 110, according to certain embodiments of the present disclosure. The review screen 1200 identifies the product and provides the user with an option to add a photo. In this example, the product is identified by name 220, and an image 210 of the product and an indication 230 of the product's overall user rating is also included. To add a photo, the user taps an activation button 240 to activate the camera interface 136 of the computing device 110. In the review screen 200 as shown in FIG. 2, the upload button 250 is grayed out to indicate that upload functionality is not yet available because no photo has been selected yet.

Figure 3:
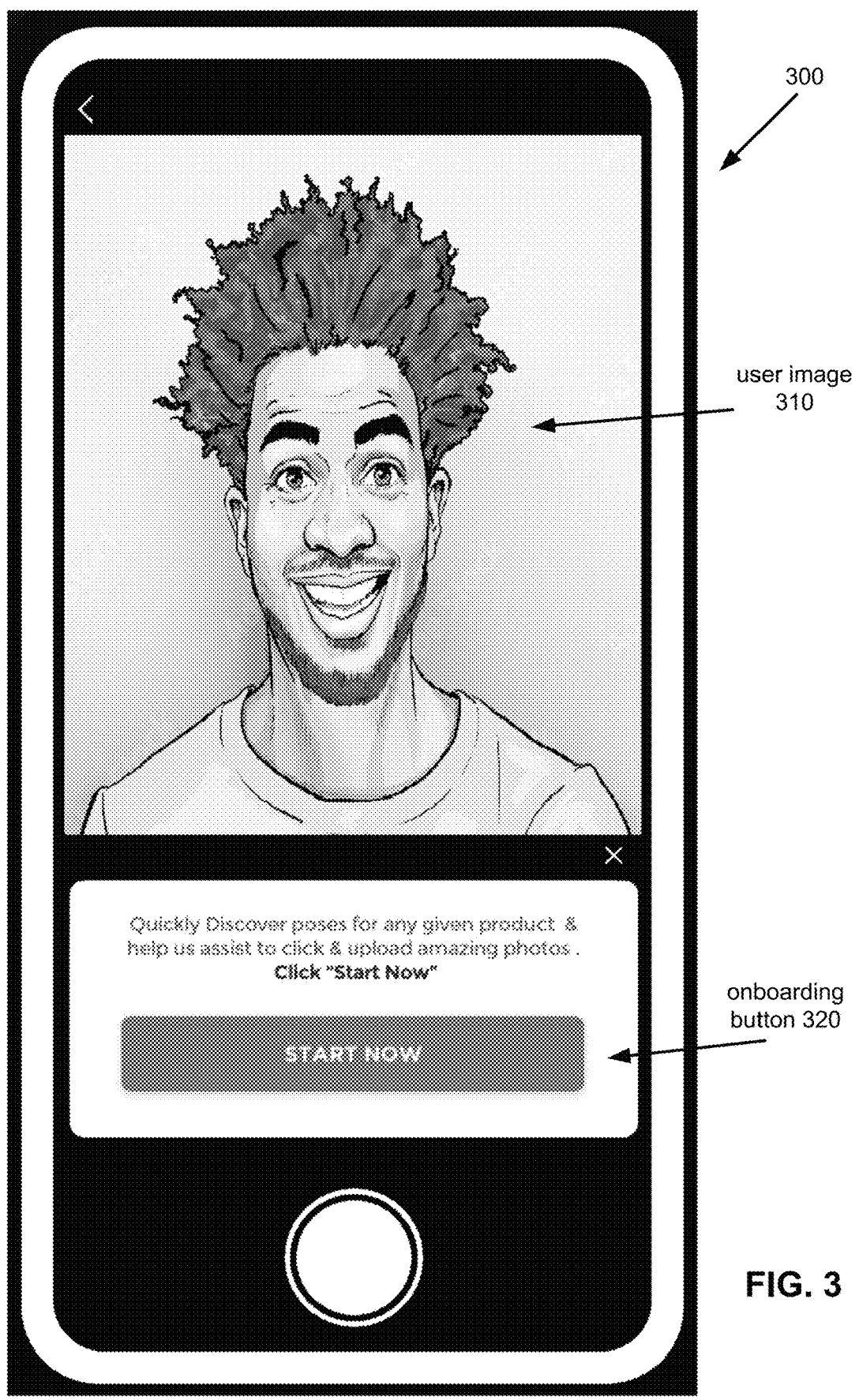
FIG. 3 shows an example of an onboarding screen of a pose-guidance portion of an e-commerce app, according to certain embodiments of the present disclosure.

FIG. 3 shows an example of an onboarding screen 300 of the pose-guidance portion of the e-commerce app 120, according to certain embodiments of the present disclosure. In this example, the camera interface 136 is active and a live stream of user images 310 (e.g., captured by a front-facing camera of the computing device 110) is displayed. To initiate the pose-recommendation process, the user taps an onboarding button 320.

FIGS. 4A-4C show several examples of communications between pose-recommending module 124 and pose retrieval module 184, according to certain embodiments of the present disclosure. In each case, the pose-recommending module 124 sends the pose retrieval module 184 a request (e.g., an HTTP request) over the network 170. The pose-recommending module 124 may send the request in response to user initiation of the pose-recommendation process (e.g., by tapping an onboarding button).

In the examples of FIGS. 4A and 4B, the request includes a product identifier. The product identifier may indicate a name of the product, a category of the product (wristwatch, backpack, saree, women's shoes, etc.), or a numeric identifier, such as a universal product code (UPC) or a stock keeping unit (SKU).

In the example of FIG. 4C, the request includes a product identifier as described above and also includes additional contextual information which may be relevant to selecting an appropriate pose recommendation. Such information may include, for example, a gender of the user (subject to a prior approval by the user, which may be configured by the user's indication of consent on a settings screen of the e-commerce app 120). Some product categories may be associated primarily with either male or female gender (necktie, purse), so that user gender information may be superfluous. However, other product categories may include products that are styled differently for each gender (e.g., wristwatch, shoes), and the corresponding poses for such products may be gender-specific as well. In such cases, including an indication of the gender of the user in the request to the pose retrieval module 184 may help to provide pose recommendations that are more likely to be selected by the user.

In one example, the pose-recommending module 124 obtains the user's gender from a user profile in the e-commerce app 120. In another example, the pose-recommending module 124 determines the user's gender by analyzing one or more images among the stream of user images 310 provided by the camera interface 136 (again, subject to a prior approval by the user). The pose-recommending module 124 may perform such analysis, for example, by executing an implementation of an algorithm (e.g., Fisherface) on the one or more images to determine the user's gender. Additionally or alternatively, the pose-recommending module 124 may determine other contextual information from one or more images among the stream of user images 310 or another stream of images provided by the camera interface 136 (e.g., from a back-facing camera of the computing device 110), such as any of indoor or outdoor (e.g., based on color temperature), time-of-day (e.g., based on illumination level), etc., and include such information in the request to the pose retrieval module 184.

The e-commerce app 120 may include an option for the user to select the categories and/or values of the context information that the pose-recommending module 124 includes in the request to the pose retrieval module 180. Such categories may include, for example, gender, time of day, sport/active or elegant, indoor or outdoor, seated or standing, etc.

The pose retrieval module 184 searches the data store 188 according to the request, retrieves pose images that match the request, and sends them in a response (e.g., an HTTP response) back to the pose-recommending module 124 via network 170. For example, the pose retrieval module 184 may create a database query (e.g., a SELECT query) from the product identifier (and possibly other contextual information) and use the query to search the tags of pose images in the data store 188 and retrieve pose images that match the request.

Figure 5A:
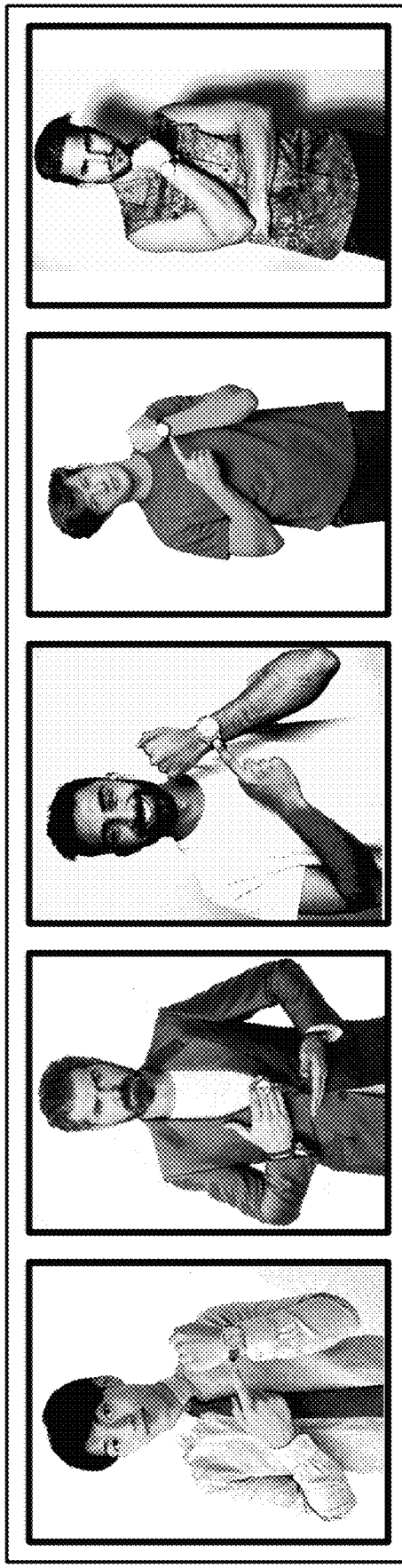
FIG. 5A shows an example of a set of candidate images, according to certain embodiments of the present disclosure.

The pose retrieval module 184 may be configured, as in the example of FIG. 4A, to return one pose image, which may be the best match among the search results, or simply the first match among the search results. This pose image is identified herein as a first candidate image. However, it may be desired, as in the examples of FIGS. 4B and 4C, for the pose retrieval module 184 to be configured instead to return a set of pose images (candidate images) to the pose-recommending module 124 (e.g., to allow the user to select a preferred pose from among multiple options). The number N of candidate images to be included in the response by the pose retrieval module 184 to the pose-recommending module 124 may be configured in a setting of the e-commerce app 120. The pose retrieval module 184 may be configured to return, for example, the first N matching pose images, the N best matching pose images, or a set of N pose images that are randomly selected from the search results. FIG. 5A shows an example of a set 510 of five candidate images that may be returned by an instance of the pose retrieval module 184, according to certain embodiments of the present disclosure, in a response to a request from the pose-recommending module 124 that indicates the product identifier "men's wristwatch."

It may be desired that the response to the pose-recommending module 124 excludes pose images which have already been used (e.g., by users of other instances of the e-commerce app 120) more than some predetermined number of times (e.g., to exclude pose images that have already been used to generate at least ten guided images). The number of times that a pose image in the data store 188 has been used may be recorded in a use counter, which may be a tag of the pose image. Such a counter may be incremented (e.g., by the pose retrieval module 184) upon receiving an indication of use of the pose image (e.g., from the pose-recommending module 124 or some other module of the e-commerce app 110). Such an indication may be generated, for example, in response to a user's upload of a captured image while the pose image is currently selected in the e-commerce app 120.

Figure 6:
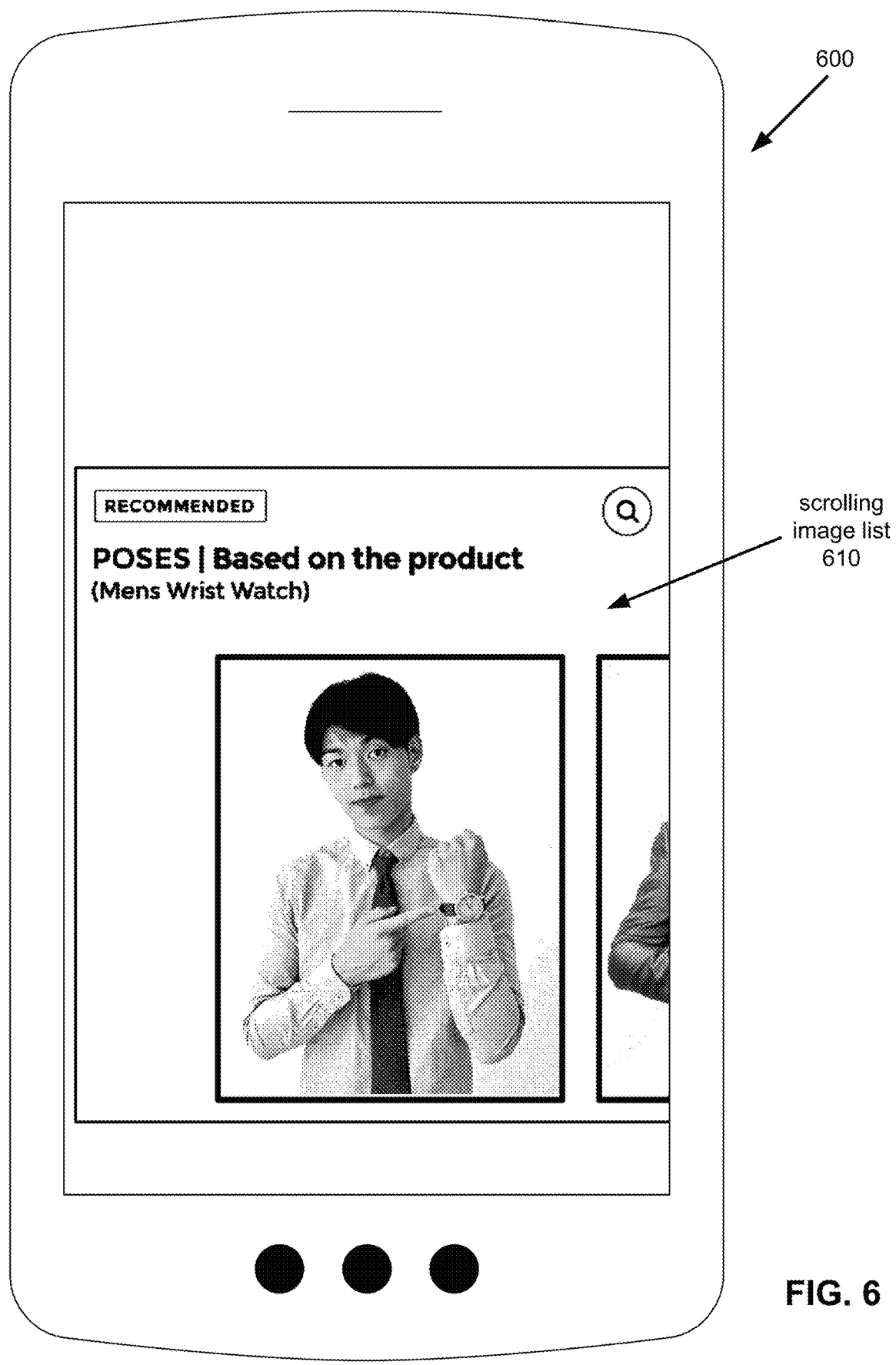
FIG. 6 shows an example of a candidate selection screen of an e-commerce app, according to certain embodiments of the present disclosure.

The pose-recommending module 124 displays the candidate images to the user (e.g., on a display of the computing device 110) for review and receives an indication of the user's selection. FIG. 6 shows an example of a candidate selection screen 600 of the e-commerce app 120 in which the set 510 of candidate images is presented to the user (e.g., on a touchscreen display of the computing device 110) as a set of thumbnails in a scrolling image list 610, according to certain embodiments of the present disclosure. In this example, the user scrolls through the set of candidate images and selects a candidate image by tapping on the corresponding thumbnail. The pose-recommending module 124 may receive an indication of the user's selection (e.g., via a touchscreen display) from an input device interface 144 of the computing device 110. As in the example of FIG. 4A discussed above, the candidate image that is selected by the user is also identified herein as a first candidate image.

As discussed in further detail below, a similarity-determining module 128 of the e-commerce app 120 determines whether a similarity between a user structure and a target structure satisfies a threshold condition, where the user structure characterizes a figure of the user in an input image and the target structure is based on a figure of a person in the first candidate image. For example, the e-commerce app 120 may guide the user to imitate the pose in the first candidate image by displaying the target structure as an overlay on the real-time user images. The e-commerce app 120 may extract the user structure from the user images, updating it as the user attempts to imitate the pose. The e-commerce app 120 may determine how well the user is currently imitating the pose by tracking the similarity between the user structure and the target structure, which may also be updated as the user structure changes. When the similarity-determining module 128 of the e-commerce app 120 determines that a similarity between the user structure and the target structure satisfies a threshold condition, an image-capturing module 132 captures the current user image (e.g., the user image at which the satisfaction of the threshold condition was determined), and the e-commerce app 120 may further present the captured image to the user for approval and uploading.

Figure 7C:
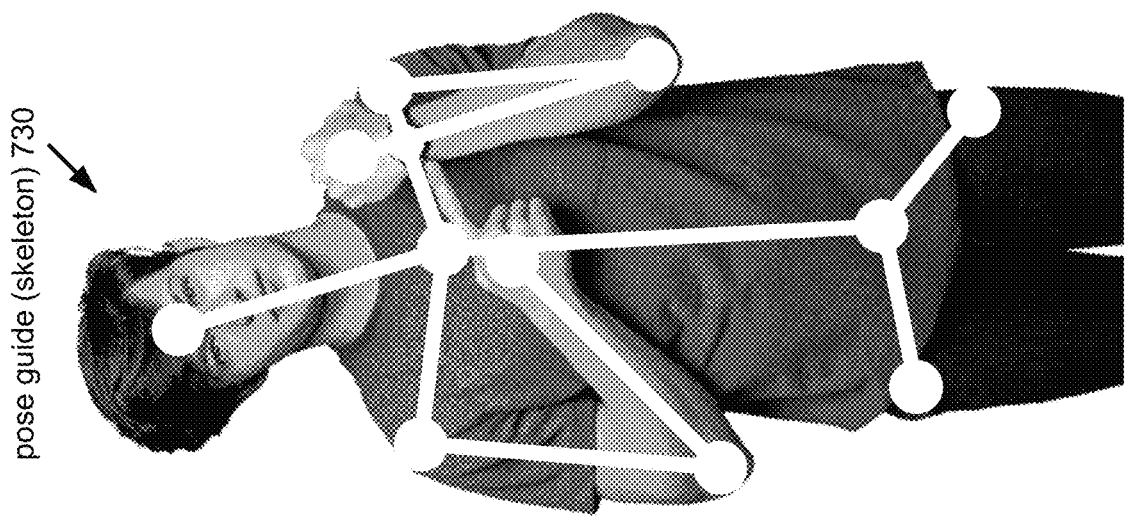
FIG. 7A shows an example of a first candidate image and FIGS. 7B and 7C show examples of a pose guide, according to certain embodiments of the present disclosure.
Figure 7B:
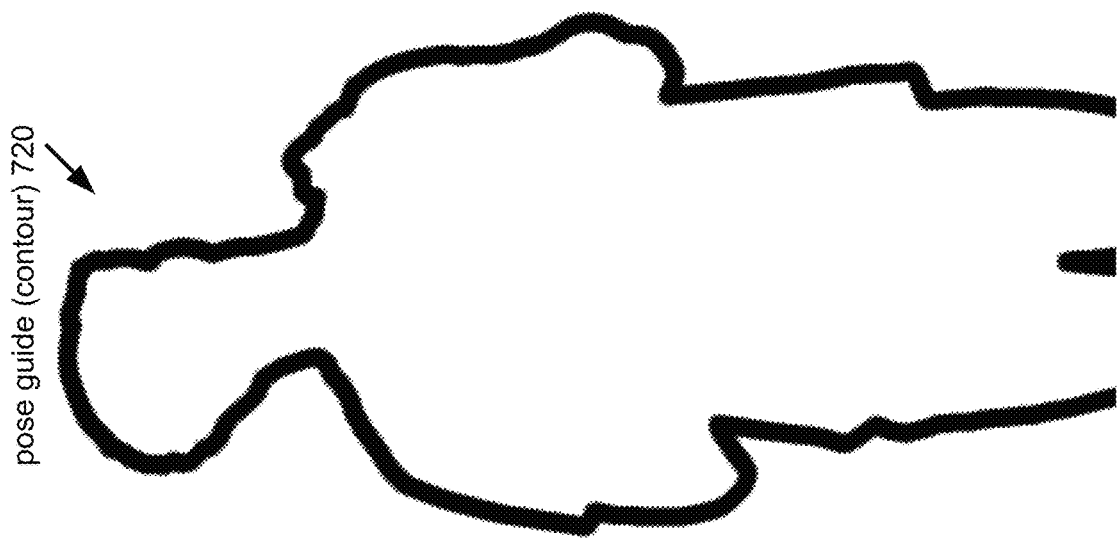
Figure 7A:
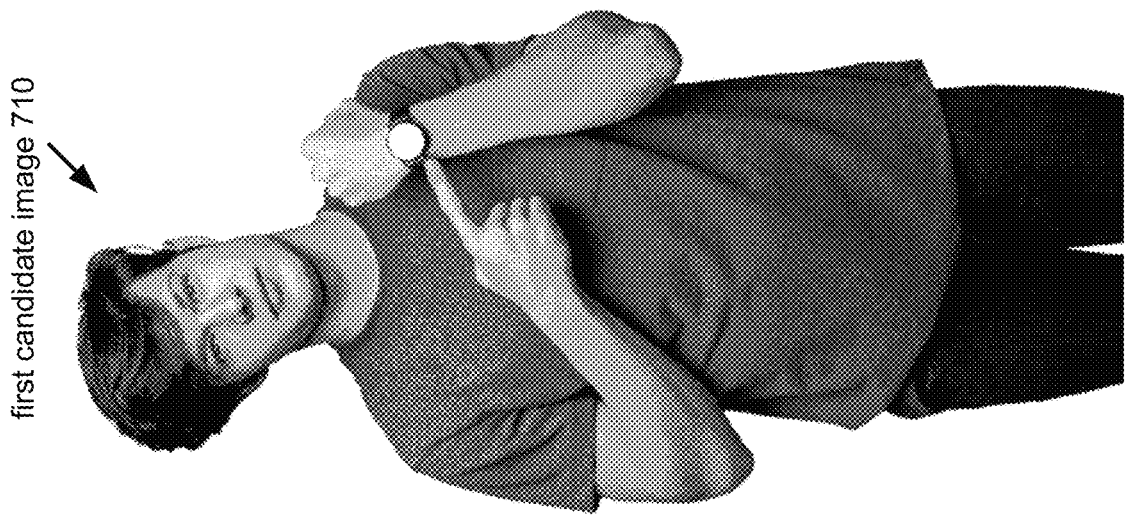

The target structure is based on a pose guide that is associated with the first candidate image. The pose guide may be a contour of the figure of the person in the first candidate image. Alternatively, the pose guide may be a skeleton (e.g., a 3D skeleton) of the figure of the person in the first candidate image. FIG. 7A shows an example of a first candidate image 710, FIG. 7B shows an example of a pose guide 720 that is a contour of the figure of the person in the first candidate image 710, and FIG. 7C shows an example of a pose guide 730 that is a 3D skeleton of the figure of the person in the first candidate image, according to certain embodiments of the present disclosure.

Figure 5B:
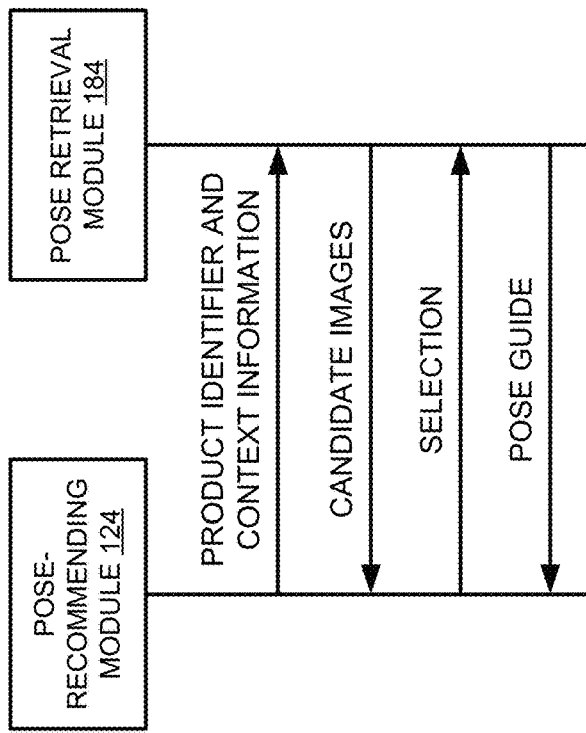
FIGS. 5B and 5C show examples of communications between a pose-recommending module and a pose retrieval module, according to certain embodiments of the present disclosure.
Figure 5C:
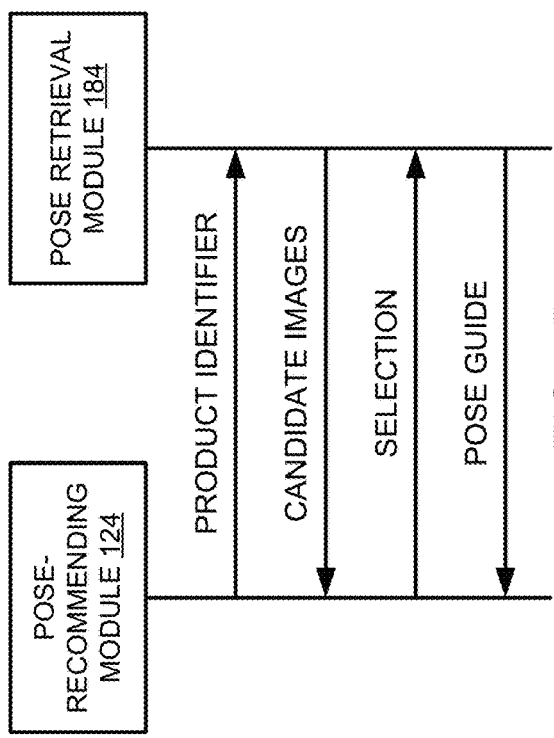

The e-commerce app 120 may obtain the pose guide from the pose storage system 180. In the example of FIG. 4A, the pose-recommending module 124 may receive the associated pose guide together with the first candidate image in the response from the pose retrieval module 184. In the examples of FIGS. 4B and 4C, the pose-recommending module 124 may receive the corresponding pose guides together with the set of candidate images in the response from the pose retrieval module 184. Alternatively, as shown in the examples of FIGS. 5B and 5C, according to certain embodiments of the present disclosure, the pose-recommending module 124 may receive the pose guide associated with the first candidate image in response to a second request to the pose retrieval module 184 that indicates which candidate image the user has selected as the first candidate image. In a further alternative, an image analysis module 148 of the e-commerce app 120 may extract the pose guide from the first candidate image (e.g., in the same manner as it extracts a user structure from a user image as described below).

Figure 8A:
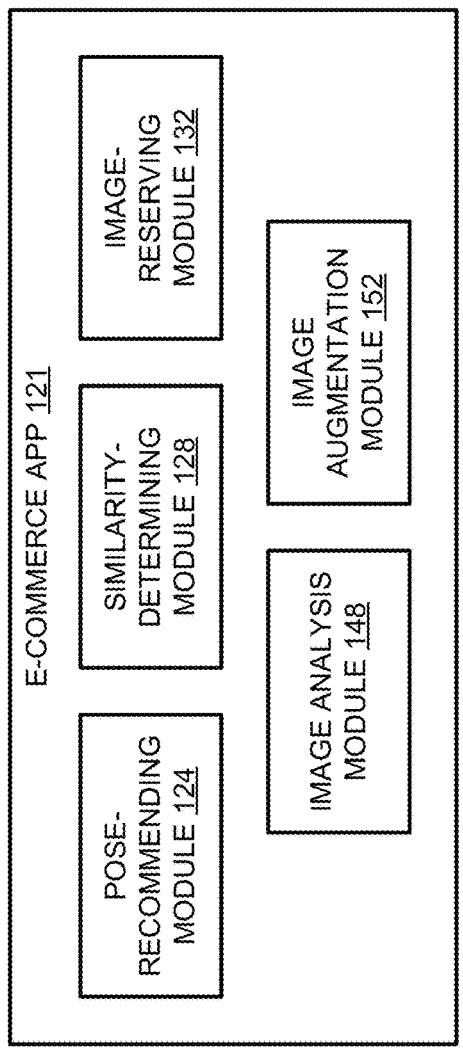
FIG. 8A shows a block diagram of an implementation of an e-commerce app, according to certain embodiments of the present disclosure.
Figure 8B:
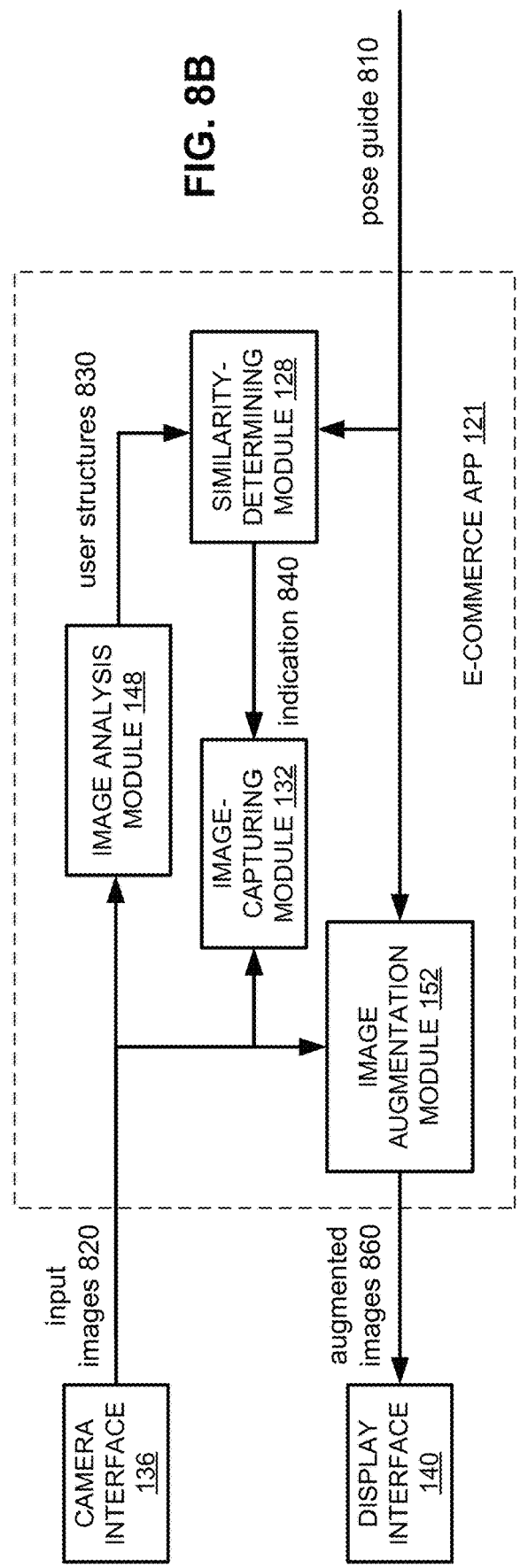
FIG. 8B shows a block diagram of an implementation of portions of an e-commerce app, according to certain embodiments of the present disclosure.

FIG. 8A shows a block diagram of an implementation 121 of e-commerce app 120 that additionally includes an image analysis module 148 and an image augmentation module 152, according to certain embodiments of the present disclosure. FIG. 8B is a block diagram that depicts processing by the image analysis module 148, the similarity-determining module 128, the image-capturing module 132, and the image augmentation module 152 of the e-commerce app 121 during pose guidance, according to certain embodiments of the present disclosure. As shown in FIG. 8B, the image analysis module 148 receives a time-ordered plurality of input images 820 (e.g., a stream at, for example, thirty frames per second). For example, the image analysis module 148 may receive the time-ordered plurality of input images 820 from the camera interface 136 (e.g., via a buffer).

Each of the time-ordered plurality of input images 820 includes an image of the user. From at least one of the time-ordered plurality of input images 820, the image analysis module 148 obtains a user structure 830 based on information from the corresponding image of the user. The image analysis module 148 may obtain the image of the user by determining a bounding box of the user in the input image 820. In one such example, the image analysis module 148 determines the bounding box using a neural network architecture (e.g., a U-Net architecture) that has been trained to extract a bounding box of a human figure from an image.

FIG. 9 shows an example 920 of an input image 820 that includes a corresponding image of a user, according to certain embodiments of the present disclosure. In FIG. 9, a bounding box 922 that defines the image of the user is overlaid on the input image 920.

The image analysis module 148 may be configured to obtain the user structure 830 based on information from at least one of the time-ordered plurality of input images 820 (e.g., from the corresponding user images of at least one of the time-ordered plurality of input images 820) by executing a pose detection and/or motion tracking algorithm, such as a full-body motion tracking algorithm, on the at least one of the time-ordered plurality of input images 820 (e.g., on corresponding user images within the input images 820). Examples of such algorithms that may be executed by image analysis module 148 include BlazePose, OpenPose, MediaPipe, AlphaPose, PoseProposal, PifPaf, and HyperPose (as identified in, e.g., Guo, Y. et al., "Fast and Flexible Human Pose Estimation with HyperPose," arXiv:2108.11826v1, 26 Aug. 2021; Bazarevsky, V. et al., "BlazePose: On-device Real-time Body Pose tracking," arXiv:2006.10204v1, 17 Jun. 2020; etc.). The image analysis module 148 may be configured to obtain the user structure 830 based on information from one corresponding input image 820 or based on information from more than one input image 820. As noted above, the image analysis module 148 may also obtain the pose guide (e.g., pose guide 720 or 730) in a similar manner (e.g., using a pose detection and/or motion tracking algorithm as noted above), based on information from the first candidate image.

Figure 10C:
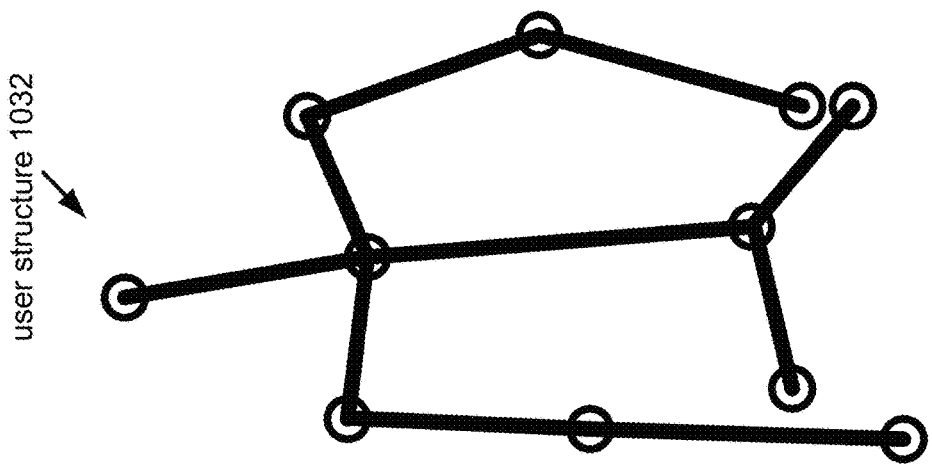
FIGS. 10A-C show examples of an input image and user structures, according to certain embodiments of the present disclosure.
Figure 10B:
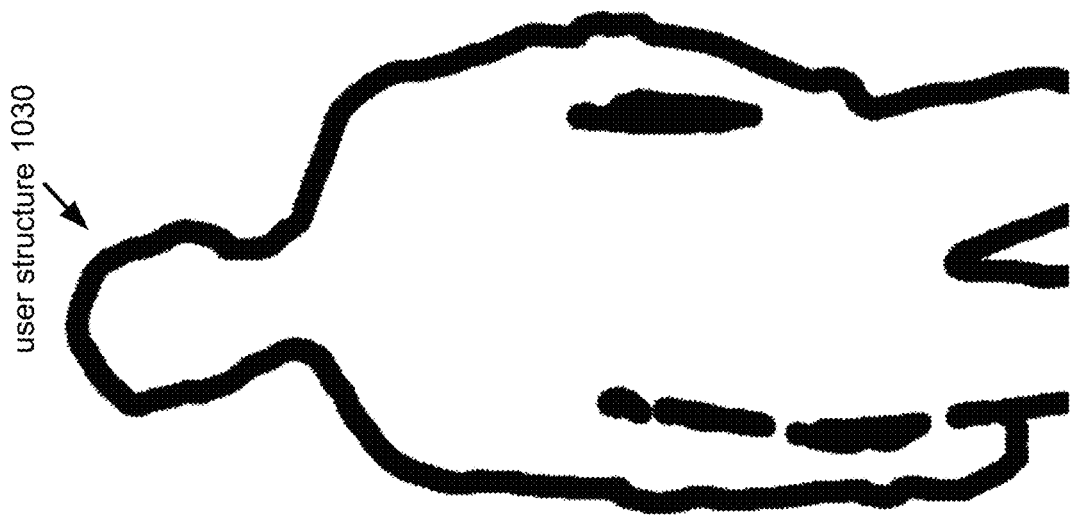
Figure 10A:
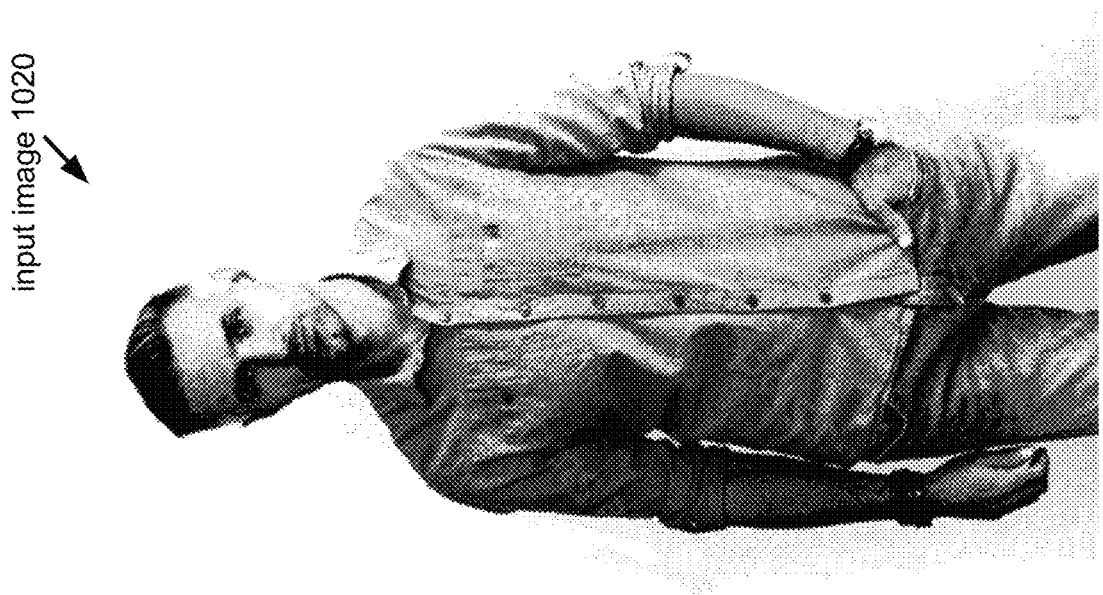

The image analysis module 148 obtains a user structure 830 that is analogous to the pose guide. For example, if the pose guide is a contour, the image analysis module 148 obtains the user structure 830 as a contour of the user (e.g., using a generalized Hough transform or other contour detection algorithm), and if the pose guide is a skeleton, the image analysis module 148 obtains the user structure 830 as a skeleton of the user. FIG. 10A shows an example 1020 of an input image 820, FIG. 10B shows an example 1030 of a user structure 830 that is a contour of the figure of the user in the input image 1020, and FIG. 10C shows an example 1032 of a user structure 830 that is a 3D skeleton of the figure of the user in the input image 1020, according to certain embodiments of the present disclosure.

As the user moves over time to imitate the pose, the figure of the user moves correspondingly within the image of the user, so that the user structure 830 becomes outdated. The image analysis module 148 obtains a time-ordered plurality of user structures 830 based on information from at least some of the time-ordered plurality of input images 820. For example, the image analysis module 148 may obtain a new instance of the user structure 830 at each of the time-ordered plurality of input images 820. Alternatively, the image analysis module 148 may obtain a new instance of the user structure 830 less frequently (e.g., at every three, five, or ten consecutive input images 820, etc.). The image analysis module 148 may track the user structure over time. For example, the image analysis module 148 may obtain a new instance of the user structure 830 based on information from a corresponding input image 820 and the most recent instance of the user structure 830.

Figure 11:
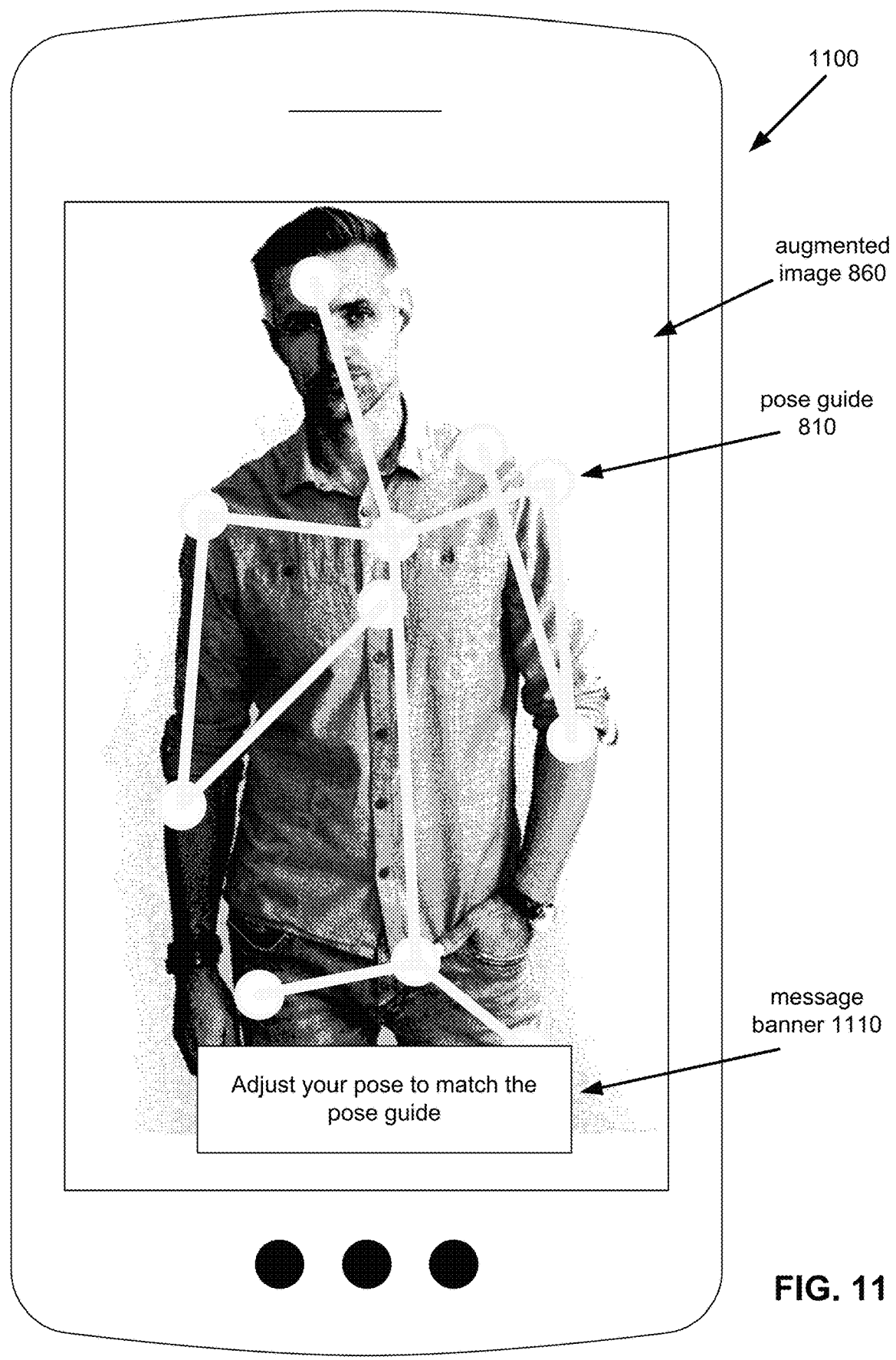
FIG. 11 shows an example of a pose guidance screen of an e-commerce app, according to certain embodiments of the present disclosure.

The image augmentation module 152 overlays a target structure on each of at least some of the time-ordered plurality of input images 820 to produce a corresponding plurality (e.g., a stream) of augmented images 860. In the example shown in FIG. 8B, the target structure is the pose guide 810. The image augmentation module 152 provides the plurality of augmented images 860 to the display interface 140 of the computing device 110. FIG. 11 shows an example of a pose guidance screen 1100 of the e-commerce app 121 in which an augmented image 860 is presented to the user (e.g., on a touchscreen display of the computing device 110), according to certain embodiments of the present disclosure. In this particular example, the pose guide 810 is the pose guide 730 as shown in FIG. 7C, and the input image 820 is the input image 1020 as shown in FIG. 10A. Such an overlay display provides real-time feedback to the user, guiding the user to adopt the desired pose (e.g., as indicated by the message banner 1110 of screen 1100).

The image augmentation module 152 may overlay the target structure at a fixed position (e.g., centered) within the input image 820, or the image augmentation module 152 may move the overlaid target structure to a position that corresponds with the image of the user within the input image 820 currently being overlaid. In such cases, the image augmentation module 152 may also align the target structure (e.g., according to information provided by image analysis module 148) to the user structure 830 that corresponds to the input image 820 currently being overlaid. In one example, the image augmentation module 152 aligns one or more hip landmarks of the overlaid target structure to corresponding hip landmarks of the user structure 830.

Additionally or alternatively, the image augmentation module 152 may orient the target structure (e.g., according to information provided by image analysis module 148) to the user structure 830 that corresponds to the input image 820 currently being overlaid. In one example, the image augmentation module 152 orients one or more torso landmarks of the overlaid target structure to corresponding torso landmarks of the user structure 830.

The similarity-determining module 128 determines when a similarity measure between the target structure and the user structure 830 satisfies a threshold condition. The similarity measure may be any standard pose similarity measure. For example, the similarity measure may be based on distances between corresponding features of the target structure and the user structure (e.g., a mean distance between the locations of corresponding joints of the two structures). When the similarity-determining module 128 determines that the similarity measure between the target structure and the current user structure 830 satisfies the threshold condition, it sends an indication 840 of the determination to an image-capturing module 132 as discussed below (e.g., by changing the state of a binary signal or register from low to high or vice versa).

It may be desired to implement the e-commerce app 120 such that the threshold condition is user-configurable (e.g., in a settings screen of the e-commerce app 120). For a case in which the user is not able to imitate a preferred pose sufficiently to satisfy the default threshold condition, providing such ability for the user to relax the threshold condition (e.g., temporarily, such as for the current first candidate image only) may reduce user frustration by enabling the user to use the preferred pose to create UGC.

Figure 12A:
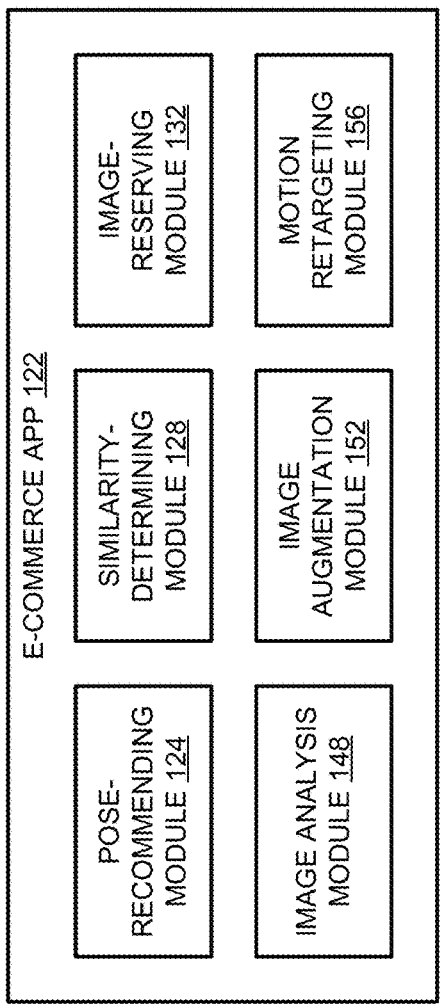
FIG. 12A shows a block diagram of an implementation of an e-commerce app, according to certain embodiments of the present disclosure.
Figure 12B:
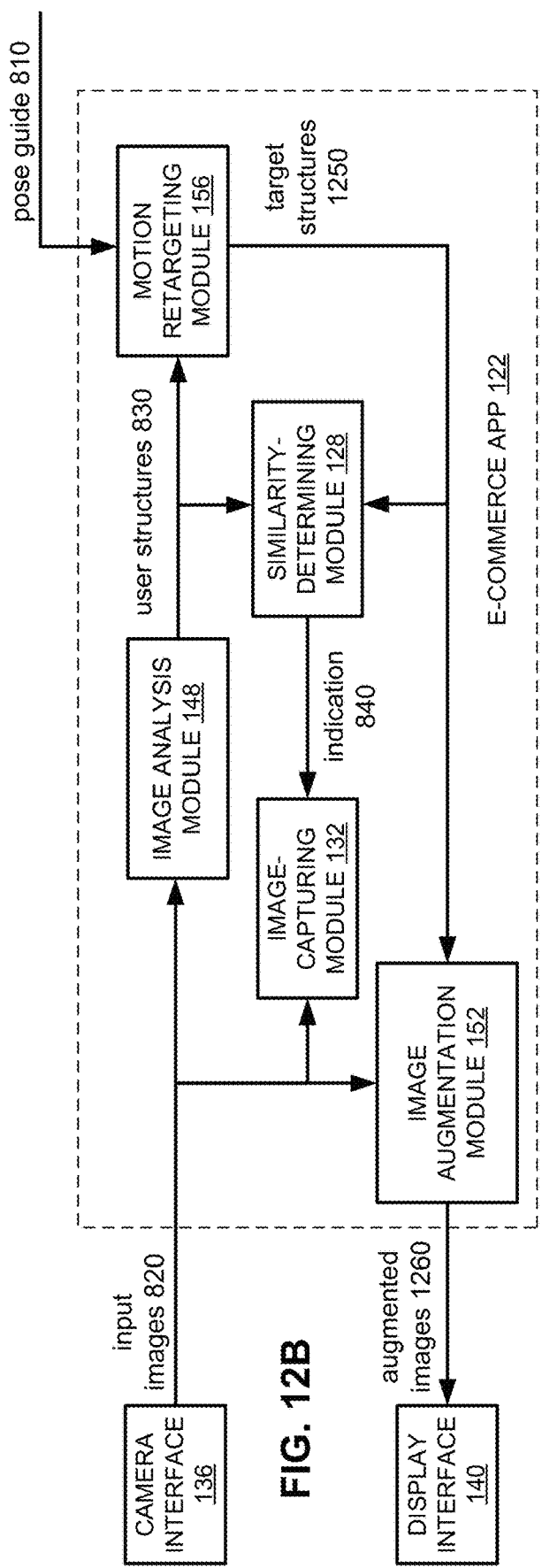
FIG. 12B shows a block diagram of an implementation of portions of an e-commerce app, according to certain embodiments of the present disclosure.

FIG. 12A shows a block diagram of an implementation 122 of e-commerce app 121 that additionally includes a motion retargeting module 156, according to certain embodiments of the present disclosure. FIG. 12B is a block diagram that depicts processing by the image analysis module 148, the similarity-determining module 128, the image augmentation module 152, the image-capturing module 132, and the motion retargeting module 156 of the e-commerce app 122 during pose guidance, according to certain embodiments of the present disclosure.

The motion retargeting module 156 produces a target structure 1250 by posing the user structure 830 in the same way as the pose guide 810 (e.g., in a pose described by the pose guide 810). For an example in which the user structure is a skeleton, the motion retargeting module 156 may produce a target structure 1250 by changing the joint angles and/or limb orientations of the user structure 830 to the corresponding angles and/or orientations in the pose guide 810, without changing the lengths of the limbs of the user structure 830. Motion retargeting may be important for obtaining a target structure that it is achievable by the user (e.g., a target structure that has the user's height and body proportions). In the absence of motion targeting, the task of visualizing and computing alignments may be more difficult.

Figure 13C:
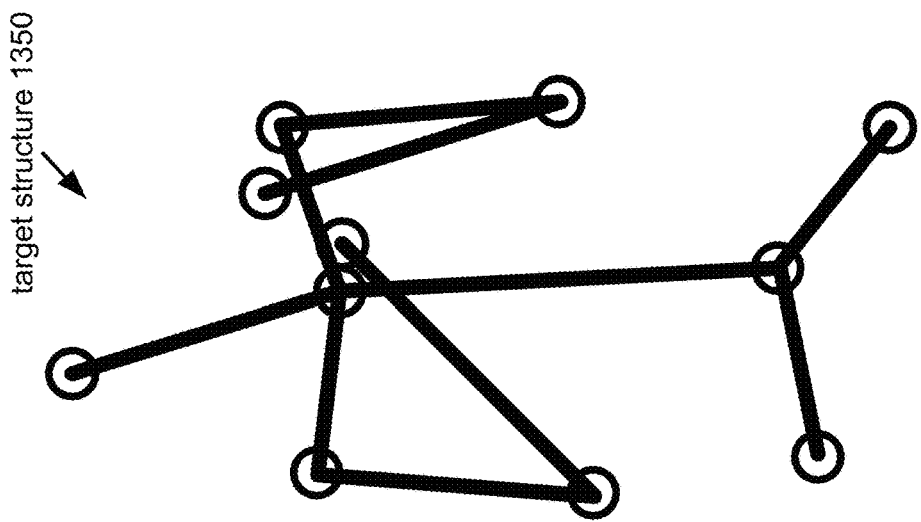
FIGS. 13A-C show examples of a user structure, a pose guide, and a target structure, respectively, according to certain embodiments of the present disclosure.
Figure 13B:
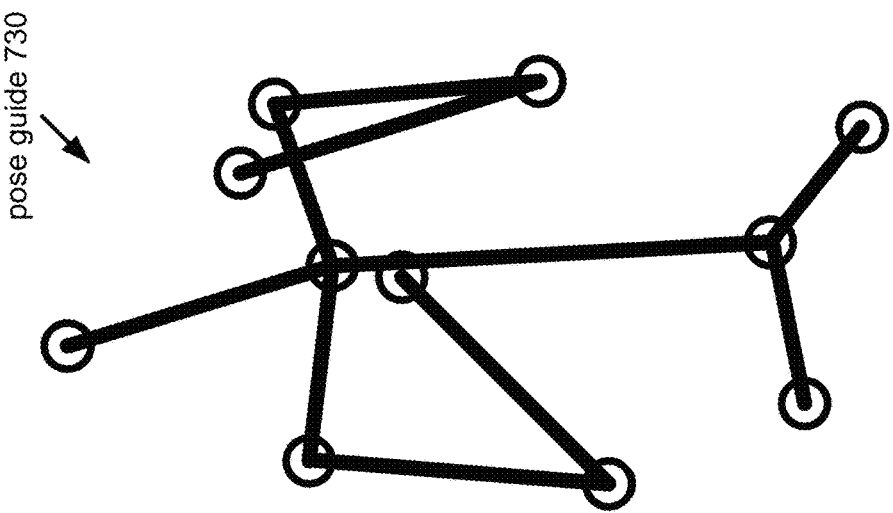
Figure 13A:
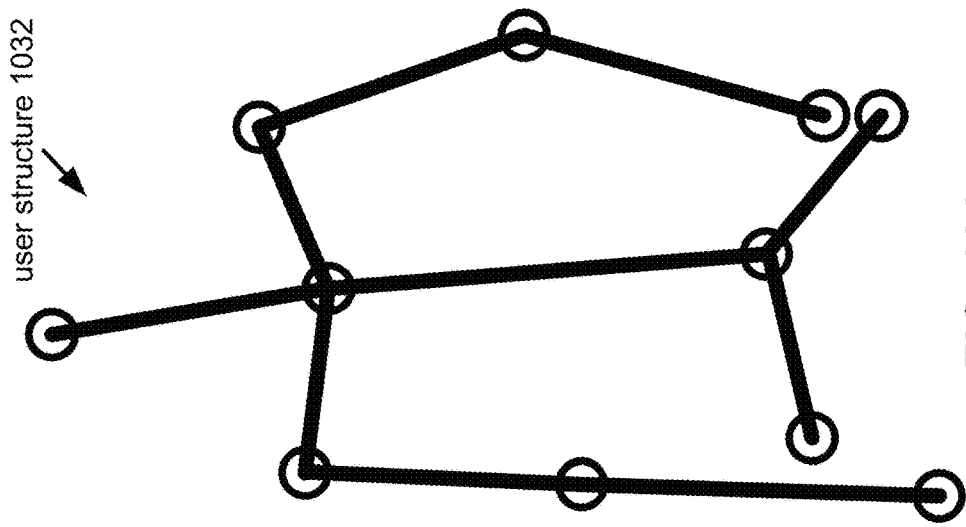

FIG. 13C shows an example 1350 of target structure 1250 that is obtained by posing the user structure 1032 (as shown again in FIG. 13A) in the same way as the pose guide 730 (as shown again in FIG. 13B), according to certain embodiments of the present disclosure.

As noted above, the user structure 830 becomes outdated over time as the user moves over time to imitate the pose. The motion retargeting module 156 obtains a time-ordered plurality of target structures 1250 based on information from at least some of the time-ordered plurality of user structures 830. For example, the motion retargeting module 156 may obtain a new instance of the target structure 1250 at each new instance of the user structure 830. Alternatively, the motion retargeting module 156 may obtain a new instance of the user structure 830 less frequently (e.g., at every three, five, or ten consecutive instances of user structure 830, etc.).

Figure 14B:
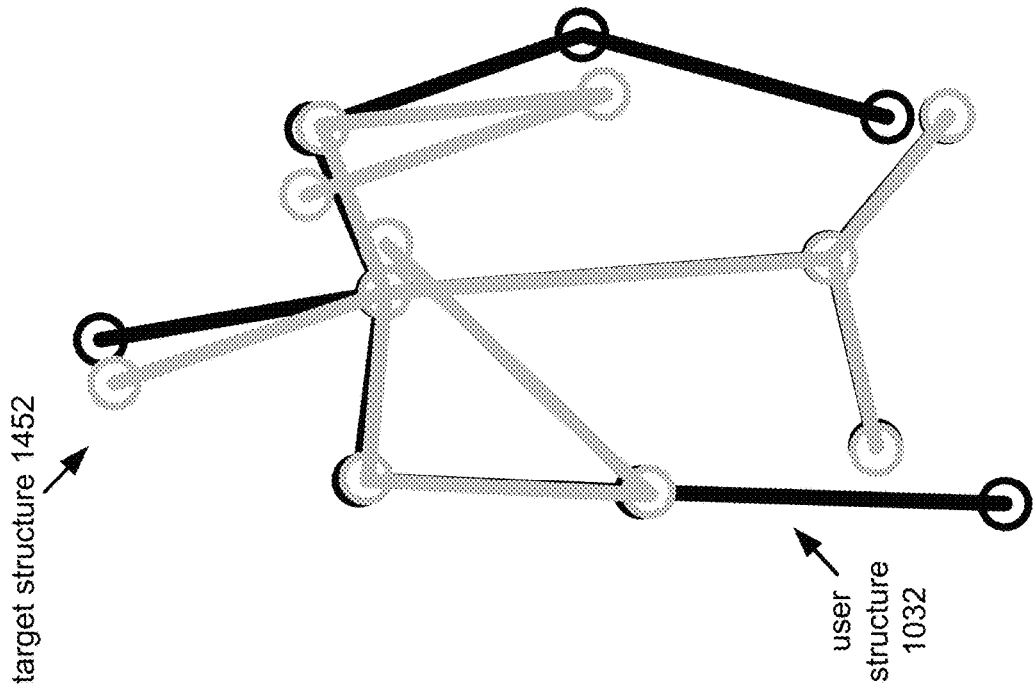
FIGS. 14A and 14B show examples of target structures, according to certain embodiments of the present disclosure.
Figure 14A:
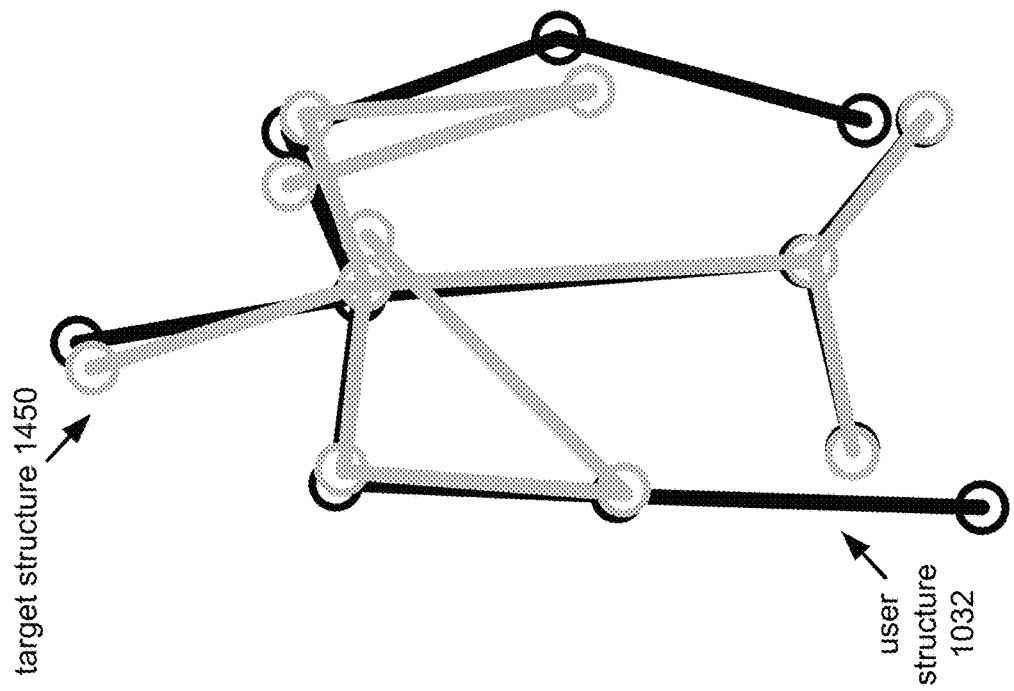

The motion retargeting module 156 may provide the target structure 1250 to image augmentation module 152 with position information for aligning the target structure 1250 with the image of the user within the input image 820 currently being overlaid (e.g., position information for aligning one or more hip landmarks of the target structure 1250 to corresponding hip landmarks of the user structure 830). FIG. 14A shows an example 1450 (shown in gray) of target structure 1350 that is aligned with the corresponding user structure 1032 (shown in black), according to certain embodiments of the present disclosure. Additionally or alternatively, the motion retargeting module 156 may orient the target structure 1250 to the user structure 830 (e.g., by orienting one or more torso landmarks of the target structure 1250 to corresponding torso landmarks of the user structure 830) or otherwise provide the image augmentation module 152 with position information for orienting the target structure 1250 with the image of the user within the input image 820 currently being overlaid. FIG. 14B shows an example 1452 (shown in gray) of target structure 1450 that is also oriented to the corresponding user structure 1032 (shown in black), according to certain embodiments of the present disclosure.

Figure 15:
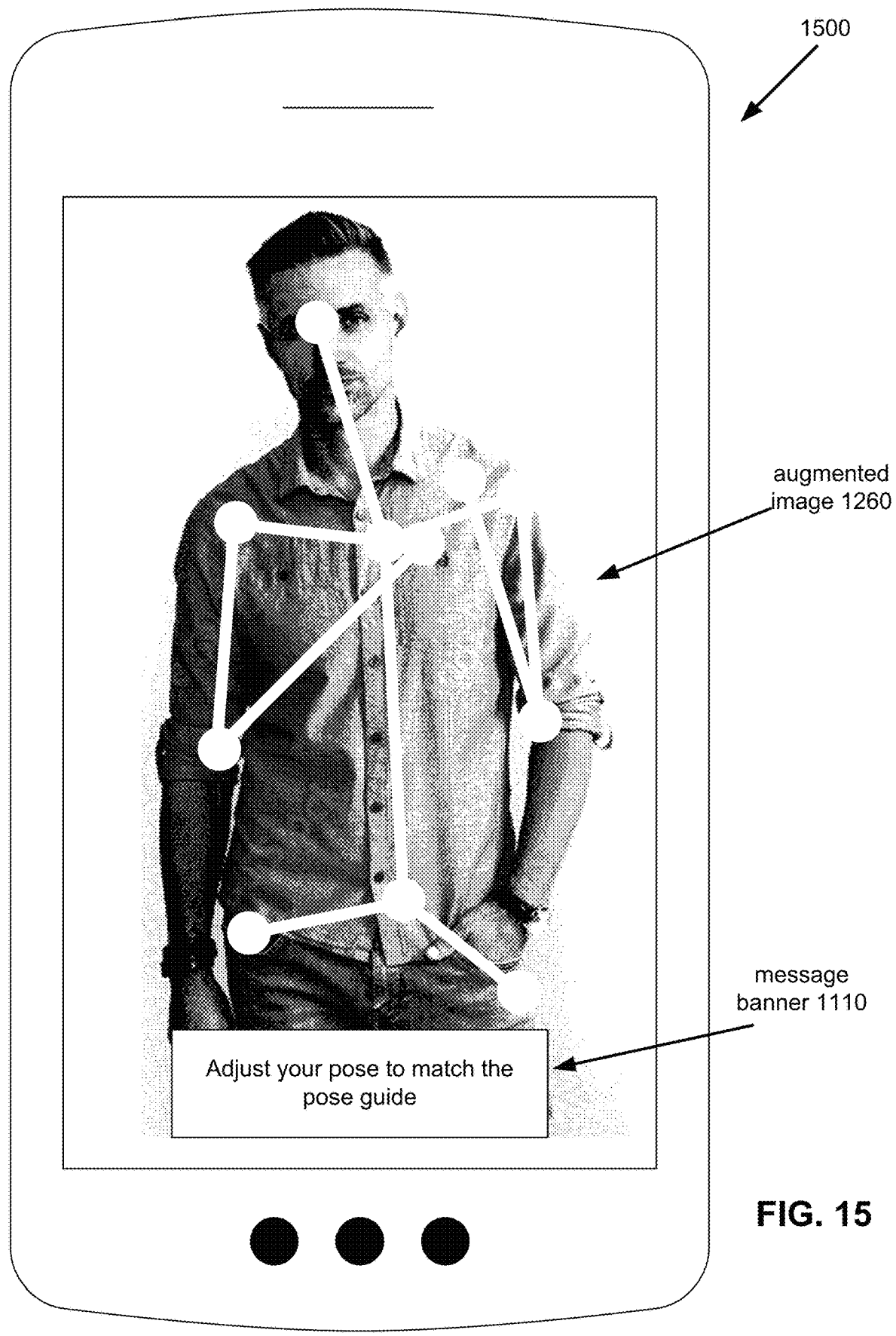
FIG. 15 shows an example of a pose guidance screen of an e-commerce app, according to certain embodiments of the present disclosure.

FIG. 15 shows an example of a pose guidance screen 1500 of the e-commerce app 122 in which an augmented image 1260 is presented to the user (e.g., on a touchscreen display of the computing device 110), according to certain embodiments of the present disclosure. In this particular example, the augmented image 1260 is produced (e.g., by the image augmentation module 152) by overlaying the target structure 1452 as shown in FIG. 14B on the input image 1020 as shown in FIG. 10A.

As noted above, when the similarity-determining module 128 determines that the similarity measure between the target structure and the current user structure 830 satisfies the threshold condition (e.g., that the user has successfully imitated the selected pose), it sends an indication 840 of the determination to an image-capturing module 132. Upon receiving the indication 840 from the similarity-determining module 128, the image-capturing module 132 captures the current input image 820. For example, the image-capturing module 132 may capture the input image 820 by copying it to a buffer and/or by preventing a buffer in which the input image 820 is stored from being overwritten.

Figure 16:
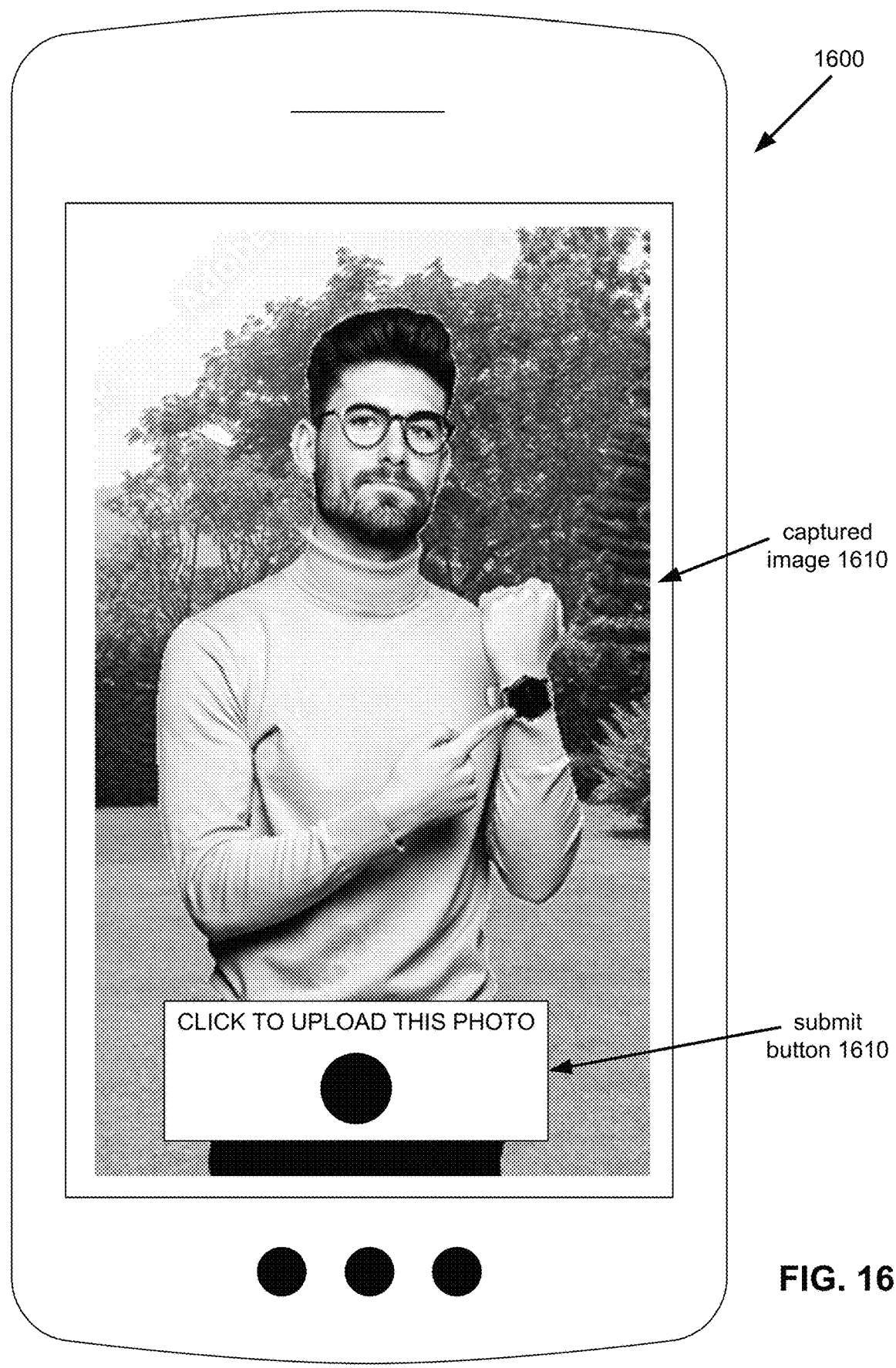
FIG. 16 shows an example of a notification screen of an e-commerce app, according to certain embodiments of the present disclosure.
Figure 17:
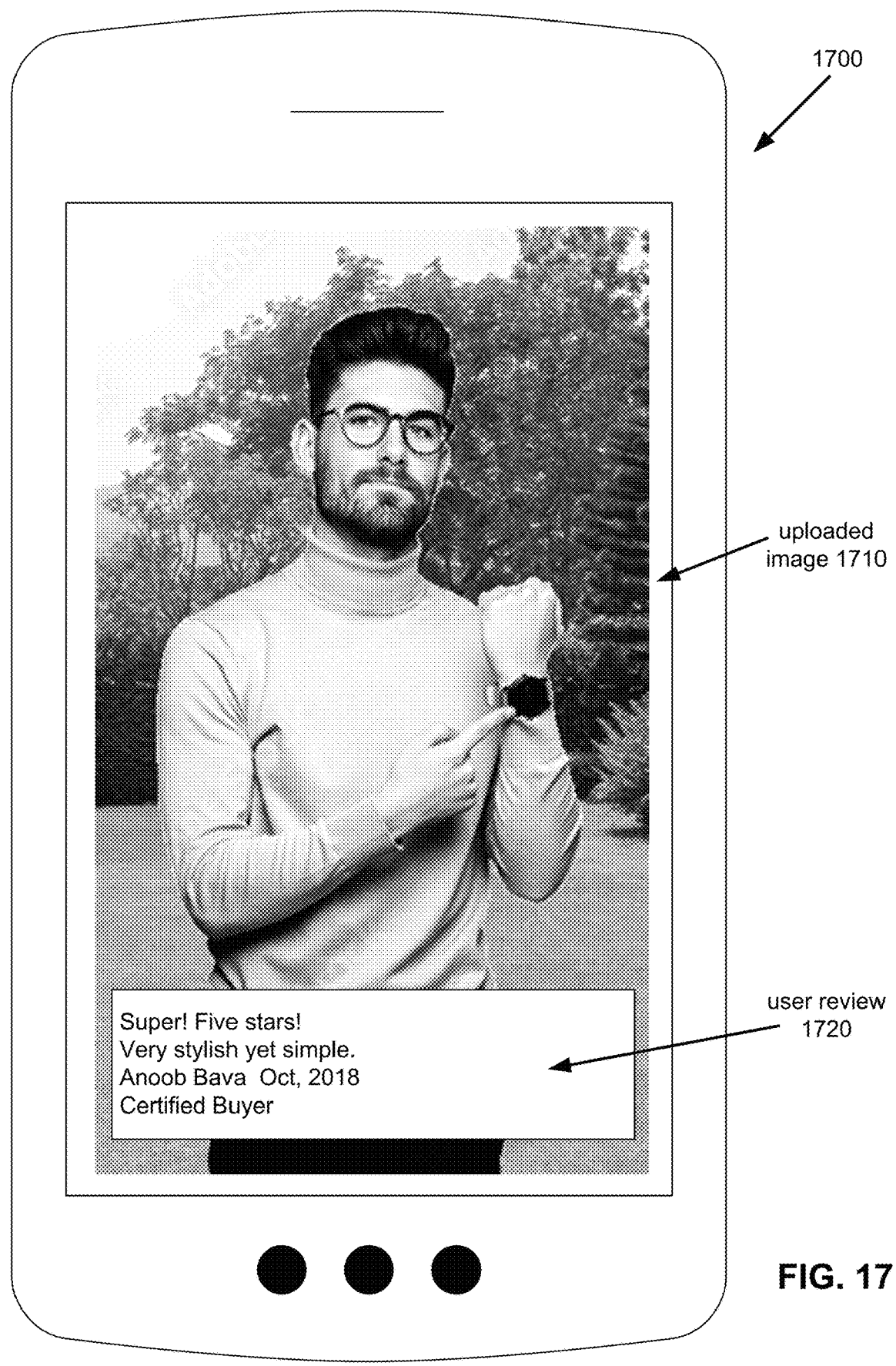
FIG. 17 shows an example of a user-generated content screen of an e-commerce app, according to certain embodiments of the present disclosure.

The e-commerce app 120 (e.g., e-commerce app 121 or 122) may also include a notification module (not shown) that is configured to notify the user that the pose image has been captured. For example, the notification module may display the captured image to the user for approval and allow the user to upload the captured image (e.g., to a UGC portion of an online shopping platform). FIG. 16 shows an example of a notification screen 1600 of the e-commerce app 120 (e.g., e-commerce app 121 or 122) in which a captured image 1610 is presented to the user (e.g., on a touchscreen display of the computing device 110), according to certain embodiments of the present disclosure. In this example, screen 1600 also includes a submit button 1610 which the user may tap to initiate uploading of the captured image 1610. Screen 1600 may also include an option for the user to reject the captured image and try again with the same selected pose, or to select a different recommended pose. FIG. 17 shows an example of a user review screen 1700 of the online shopping platform at which the uploaded image 1710 may be viewed (e.g., on a touchscreen display of the computing device 110), optionally with a user review 1720 that has also been submitted by the user, according to certain embodiments of the present disclosure.

Figure 18:
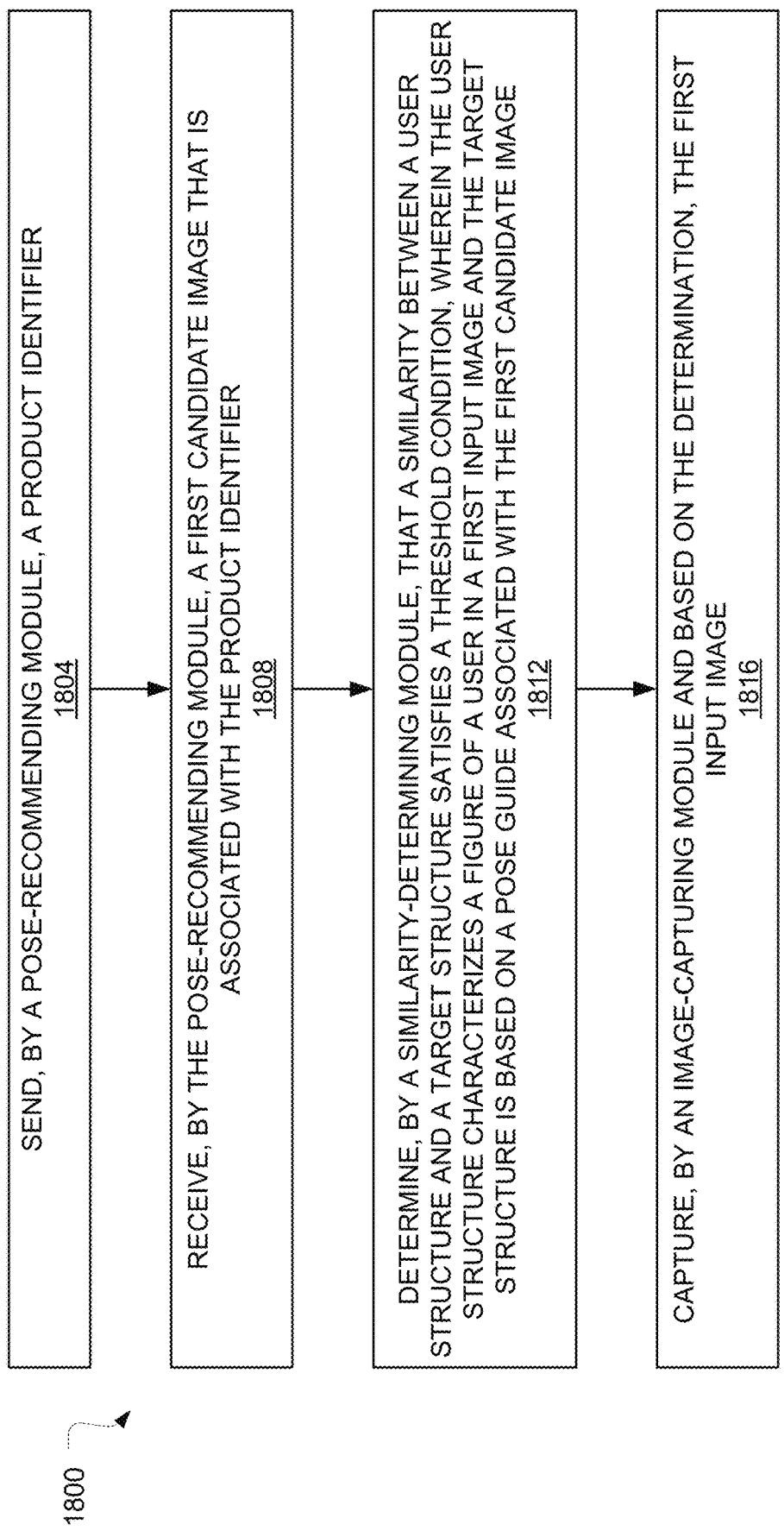
FIG. 18 depicts a flow diagram for producing user-generated content, according to certain embodiments of the present disclosure.

FIG. 18 depicts an example of a process 1800 for producing UGC, according to certain embodiments of the present disclosure. One or more computing devices (e.g., the computing device 110) implement operations depicted in FIG. 18 by executing suitable program code. For example, process 1800 may be performed by the e-commerce app 120 (or 121 or 122). For illustrative purposes, the process 1800 is described with reference to certain examples depicted in the figures. Other implementations, however, are possible.

At block 1804, the process involves sending a product identifier (e.g., by a pose-recommending module). For example, the process may involve sending a request that includes the product identifier and may include other contextual information.

At block 1808, the process involves receiving (e.g., by the pose-recommending module) a first candidate image that is associated with the product identifier. For example, the process may involve receiving a set of candidate images and receiving a user selection of the first candidate image from among the set of candidate images.

At block 1812, the process involves determining (e.g., by a similarity-determining module) that a similarity between a user structure and a target structure satisfies a threshold condition, wherein the user structure characterizes a figure of a user in a first input image and the target structure is based on a pose guide associated with the first candidate image.

At block 1816, the process involves capturing, by an image-capturing module and based on the determining, the first input image. For example, the capturing may include copying the first input image to a buffer or preventing a buffer in which the first input image is stored from being overwritten.

Example of a Computing System for Implementing Certain Embodiments

Figure 19:
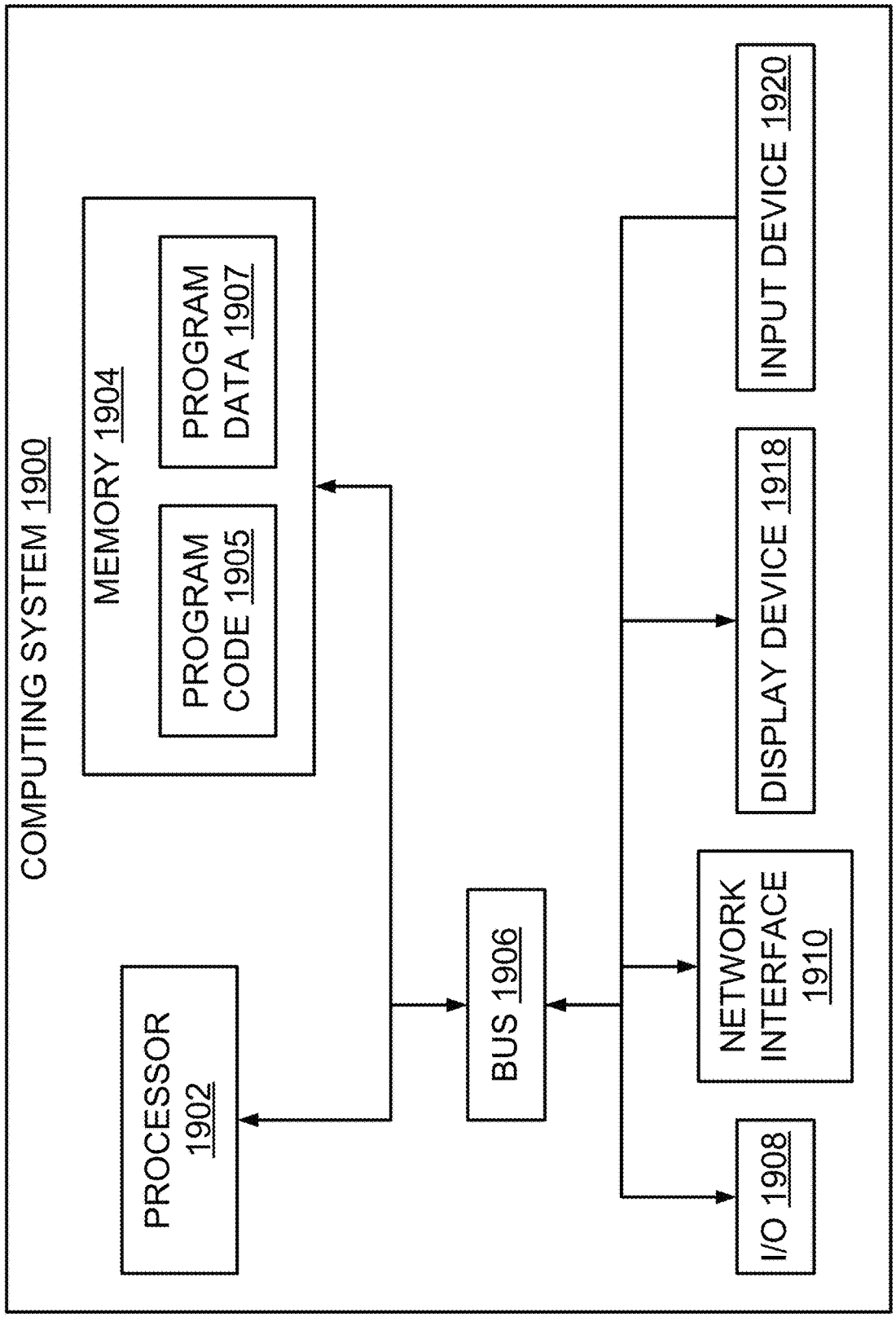
FIG. 19 depicts an example of a computing system for implementing certain embodiments of the present disclosure.

Any suitable computing system or group of computing systems can be used for performing the operations described herein. For example, FIG. 19 depicts an example of the computing system 1900, according to certain embodiments of the present disclosure. The implementation of computing system 1900 could be used to implement a computing device 110 or a pose retrieval server 182. In other embodiments, a single computing system 1900 having devices similar to those depicted in FIG. 19 (e.g., a processor, a memory, etc.) combines the one or more operations and data stores depicted as separate systems in FIG. 1.

The depicted example of a computing system 1900 includes a processor 1902 communicatively coupled to one or more memory devices 1904. The processor 1902 executes computer-executable program code stored in a memory device 1904, accesses information stored in the memory device 1904, or both. Examples of the processor 1902 include a microprocessor, an application-specific integrated circuit (ASIC), a field-programmable gate array (FPGA), or any other suitable processing device. The processor 1902 can include any number of processing devices, including a single processing device.

A memory device 1904 includes any suitable non-transitory computer-readable medium for storing program code 1905, program data 1907, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1900 executes program code 1905 that configures the processor 1902 to perform one or more of the operations described herein. Examples of the program code 1905 include, in various embodiments, the e-commerce app 120 (or 121 or 122), the pose-recommending module 124, the similarity-determining module 128, the image-capturing module 132, the image analysis module 148, the image augmentation module 152, the motion retargeting module 156, the pose-retrieval module 184, or other suitable applications or modules that perform one or more operations described herein. The program code may be resident in the memory device 1904 or any suitable computer-readable medium and may be executed by the processor 1902 or any other suitable processor.

In some embodiments, one or more memory devices 1904 stores program data 1907 that includes one or more datasets and models described herein. Examples of these datasets include interaction data, performance data, etc. In some embodiments, one or more of data sets, models, and functions are stored in the same memory device (e.g., one of the memory devices 1904). In additional or alternative embodiments, one or more of the programs, data sets, models, and functions described herein are stored in different memory devices 1904 accessible via a data network. One or more buses 1906 are also included in the computing system 1900. The buses 1906 communicatively couple one or more components of a respective one of the computing system 1900.

In some embodiments, the computing system 1900 also includes a network interface device 1910. The network interface device 1910 includes any device or group of devices suitable for establishing a wired or wireless data connection to one or more data networks (e.g., network 170). Non-limiting examples of the network interface device 1910 include an Ethernet network adapter, a modem, and/or the like. The computing system 1900 is able to communicate with one or more other computing devices (e.g., a pose storage system 180) via a data network using the network interface device 1910.

The computing system 1900 may also include a number of external or internal devices, an input device 1920, a presentation device 1918, or other input or output devices. For example, the computing system 1900 is shown with one or more input/output (I/O) interfaces 1908. An I/O interface 1908 can receive input from input devices or provide output to output devices. An input device 1920 can include any device or group of devices suitable for receiving visual, auditory, or other suitable input that controls or affects the operations of the processor 1902. Non-limiting examples of the input device 1920 include a touchscreen, a mouse, a keyboard, a microphone, a separate mobile computing device, etc. A presentation device 1918 can include any device or group of devices suitable for providing visual, auditory, or other suitable sensory output. Non-limiting examples of the presentation device 1918 include a touchscreen, a monitor, a speaker, a separate mobile computing device, etc.

Although FIG. 19 depicts the input device 1920 and the presentation device 1918 as being local to the computing device that executes the one or more applications noted above, other implementations are possible. For instance, in some embodiments, one or more of the input device 1920 and the presentation device 1918 can include a remote client-computing device that communicates with the computing system 1900 via the network interface device 1910 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Additionally, the use of "or" is meant to be open and inclusive, in that "or" includes the meaning "and/or" unless specifically directed otherwise. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   sending, by a pose-recommending module, a product identifier;
   receiving, by the pose-recommending module, a first candidate image that is associated with the product identifier, wherein the product identifier is not derived by the pose-recommending module;
   determining, by a similarity-determining module, that a similarity between a user structure and a target structure satisfies a threshold condition, wherein the user structure characterizes a figure of a user in a first input image and the target structure is based on a pose guide associated with the first candidate image; and capturing, by an image-capturing module and based on the determination, the first input image.

2. The method of claim 1, wherein the product identifier indicates a name of a product, a category of the product, a universal product code (UPC), or a stock keeping unit (SKU).

3. The method of claim 1, wherein the sending comprises sending, by the pose-recommending module, a request that includes the product identifier and also includes contextual information obtained from a user profile, from a user selection, or from at least one image provided by a camera interface.

4. The method of claim 1, wherein the method comprises:
receiving, by the pose-recommending module, a plurality of candidate images that are associated with the product identifier, wherein the plurality of candidate images includes the first candidate image; and
receiving, by the pose-recommending module, an indication that the user has selected the first candidate image.

5. The method of claim 4, wherein the method further comprises displaying, on a display of a computing device, the plurality of candidate images.

6. The method of claim 1, wherein the pose guide describes a first structure that characterizes a human figure in the first candidate image.

7. The method of claim 6, wherein the user structure comprises at least one of a contour of the figure of the user and a skeleton of the figure of the user; and
wherein the first structure comprises at least one of a contour of the human figure and a skeleton of the human figure.

8. The method of claim 6, wherein the method comprises producing the target structure, by a motion retargeting module, by posing the user structure in a pose described by the pose guide.

9. The method of claim 1, wherein the method further comprises:
receiving, by an image analysis module, a time-ordered plurality of input images of the user, wherein the time-ordered plurality of input images includes the first input image; and
obtaining, by the image analysis module, the user structure from at least the first input image.

10. The method of claim 9, wherein the method further comprises displaying an augmented image in which a second target structure that is based on the pose guide is overlaid on a second input image of the time-ordered plurality of input images.

11. The method of claim 1, wherein the similarity between the user structure and the target structure is based on distances between corresponding features of the target structure and the user structure.

12. The method of claim 1, wherein the method further comprises sending, by the pose-recommending module and based on the determination, an indication of use of the first candidate image.

13. The method of claim 1, wherein the capturing comprises at least one of: copying the first input image to a buffer, or preventing a buffer in which the first input image is stored from being overwritten.

14. A non-transitory computer-readable medium having program code that is stored thereon, the program code executable by one or more processing devices for performing operations comprising:

sending a product identifier;
receiving a plurality of candidate images that are associated with the product identifier, wherein the product identifier is not derived by a pose-recommending module;
receiving an indication that a user has selected a first candidate image from among the plurality of candidate images;
determining that a similarity between a user structure and a target structure satisfies a threshold condition, wherein the user structure characterizes a figure of the user in a first input image and the target structure is based on a pose guide associated with the first candidate image; and
capturing, based on the determining, the first input image.

15. The non-transitory computer-readable medium of claim 14, wherein the product identifier indicates a name of a product, a category of the product, a universal product code (UPC), or a stock keeping unit (SKU).

16. The non-transitory computer-readable medium of claim 14, wherein:
the pose guide describes a first structure that characterizes a human figure in the first candidate image;
the first structure comprises a skeleton of the human figure;
the user structure comprises a skeleton of the figure of the user; and
the operations further comprise producing the target structure, by a motion retargeting module, by posing the user structure in a pose described by the pose guide.

17. The non-transitory computer-readable medium of claim 14, wherein the operations further comprise:
receiving a time-ordered plurality of input images of the user, wherein the time-ordered plurality of input images includes the first input image;
obtaining the user structure from at least the first input image; and
displaying an augmented image in which a second target structure that is based on the pose guide is overlaid on a second input image of the time-ordered plurality of input images.

18. The non-transitory computer-readable medium of claim 14, wherein the similarity between the user structure and the target structure is based on distances between corresponding features of the target structure and the user structure.

19. A computing device comprising:
a pose-recommending module configured to:
send a request that includes a product identifier;
receive a plurality of candidate images that are associated with the product identifier, wherein the product identifier is not derived by the pose-recommending module; and
receive an indication that a user has selected a first candidate image from among the plurality of candidate images;
a similarity-determining module configured to determine that a similarity between a user structure and a target structure satisfies a threshold condition, wherein the user structure characterizes a figure of the user in a first input image and the target structure is based on a pose guide associated with the first candidate image; and
an image-capturing module configured to capture, based on the determination, the first input image.

20. The computing device of claim 19, wherein:
the pose guide describes a first structure that characterizes a human figure in the first candidate image;

the first structure comprises a skeleton of the human figure;

the user structure comprises a skeleton of the figure of the user; and the computing device further comprises a motion retargeting module configured to produce the target structure by posing the user structure in a pose described by the pose guide.

\* \* \* \* \*